US012466857B2

(12) United States Patent
Fiedler et al.

(10) Patent No.: US 12,466,857 B2
(45) **Date of Patent: *Nov. 11, 2025**

(54) TRIPLE-HELICAL POLYPEPTIDES LACKING BINDING AFFINITY FOR THE Fc DOMAIN OF IMMUNOGLOBULIN AND USES THEREOF

(71) Applicant: Navigo Proteins GmbH, Halle/Saale (DE)

(72) Inventors: Erik Fiedler, Halle/Saale (DE); Ulrich Haupts, Halle/Saale (DE); Madlen Zwarg, Halle/Saale (DE)

(73) Assignee: Navigo Proteins GmbH, Halle/Saale (DE)

( * ) Notice: Subject to any disclaimer, the term of this patent is extended or adjusted under 35 U.S.C. 154(b) by 1126 days.

This patent is subject to a terminal disclaimer.

(21) Appl. No.: 17/292,212

(22) PCT Filed: Nov. 12, 2019

(86) PCT No.: PCT/EP2019/081078

§ 371 (c)(1),
(2) Date: May 7, 2021

(87) PCT Pub. No.: WO2020/099442

PCT Pub. Date: May 22, 2020

(65) Prior Publication Data

US 2022/0073564 A1 Mar. 10, 2022

(30) Foreign Application Priority Data

Nov. 12, 2018 (EP) .................................... 18205679
Apr. 3, 2019 (EP) .................................... 19167107

(51) Int. Cl.
*C07K 14/00* (2006.01)

(52) U.S. Cl.
CPC ........ *C07K 14/001* (2013.01); *C07K 2319/00* (2013.01)

(58) Field of Classification Search
CPC .................................................... C07K 14/001
See application file for complete search history.

(56) References Cited

PUBLICATIONS

Bodsky, B., & Shah, N.K., "Protein motifs. 8. The triple-helix motif in proteins", FASEB J., Dec. 1995, vol. 9, No. 15, pp. 1537-1546.*
International Search Report for PCT/EP2019/081078 dated May 22, 2020.
Written Opinion of the International Searching Authority for PCT/EP2019/081078 dated May 22, 2020.

* cited by examiner

*Primary Examiner* — Suzanne M Noakes
(74) *Attorney, Agent, or Firm* — Jenkins, Taylor & Hunt, P.A.

(57) ABSTRACT

The present invention relates to the field of protein engineering and purification and relates in particular to novel polypeptides having a triple-helical structure and lacking binding affinity for the Fc domain of immunoglobulin. The invention further relates to uses of the novel non-Fc binding polypeptides in technical applications such as affinity chromatography, as well as in therapy and diagnostics. In addition, the present invention relates to a method of reducing the binding affinity of a polypeptide having a triple-helical structure for the Fc domain of immunoglobulin.

8 Claims, 4 Drawing Sheets

Specification includes a Sequence Listing.

FIGURE 1: Polypeptide of SEQ ID NO: 9 lacking binding affinity for the Immunoglobulin Fc region
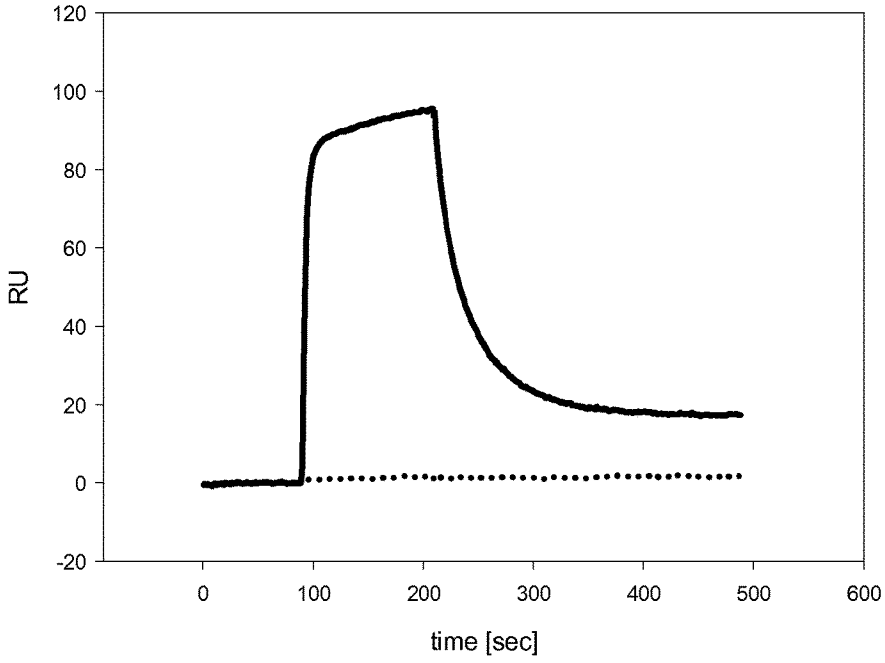
Solid line = Fc binding protein (SEQ ID NO: 17); dotted line = polypeptide of SEQ ID NO: 9.

FIGURE 2: Polypeptides of the invention lacking binding affinity for the Immunoglobulin Fc region
All concentrations = 1 μM
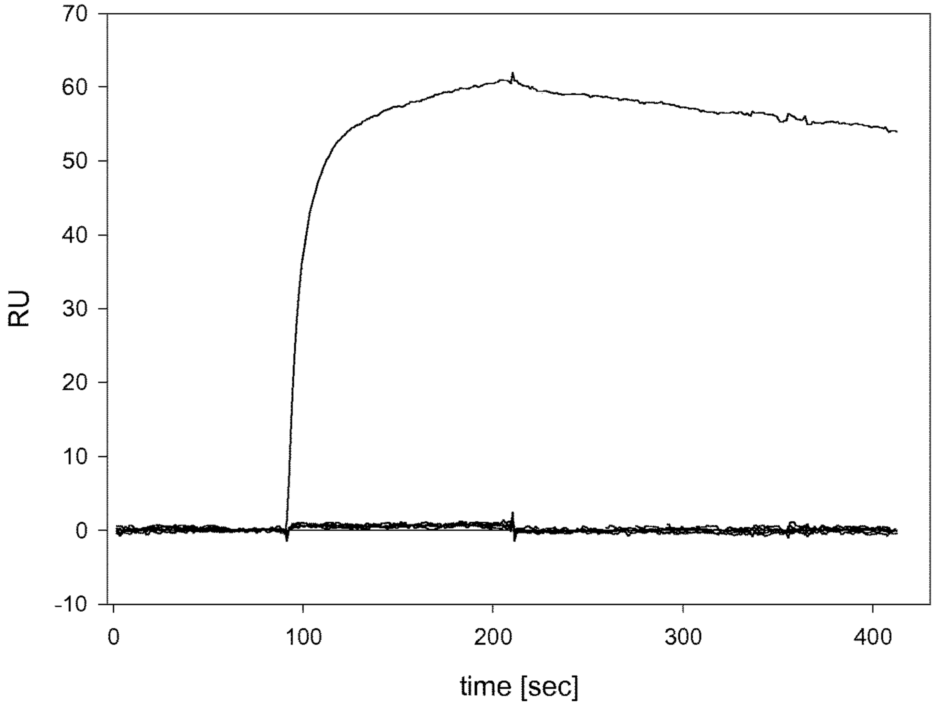
Solid line, Fc binding protein (SEQ ID NO: 16); dotted lines: SEQ ID NO: 1, 2, 3, 5, 7

FIGURE 3: Polypeptides of the invention lacking binding affinity for the Immunoglobulin Fc region
All concentrations = 10 µM
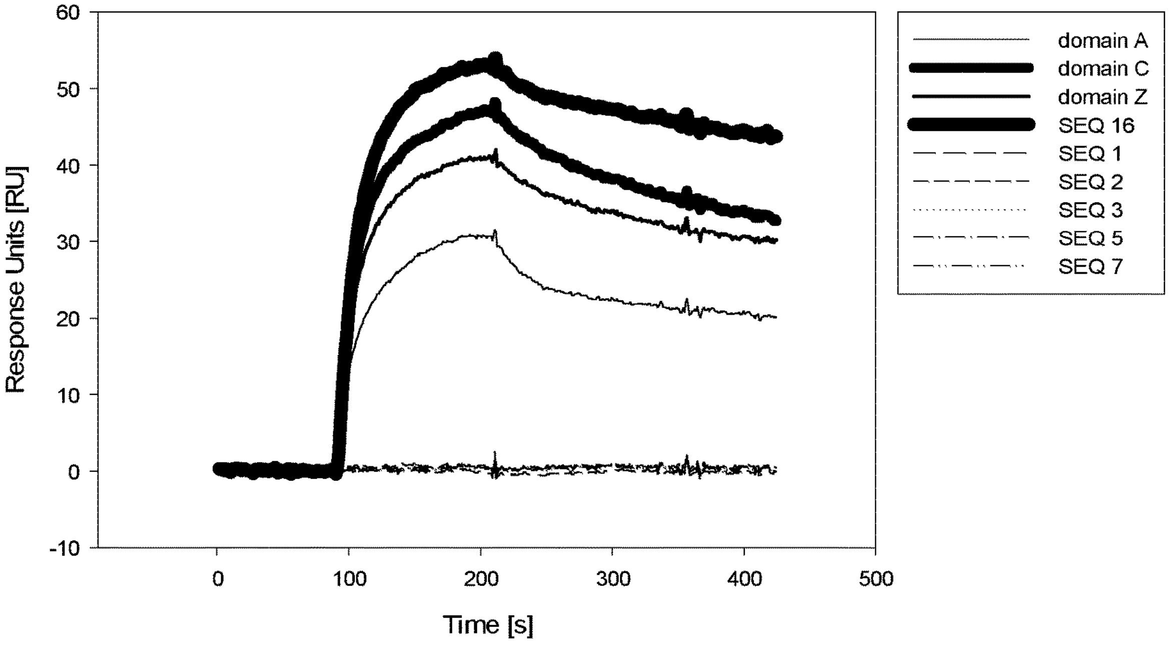

REPLACEMENT SHEET DRAWINGS PAGE 4 PCT/EP2019/081078
FIGURE 4: Improved recovery of fusion proteins of non-Fc-binding protein SEQ ID NO: 1 and proteins with target binding properties (BP)
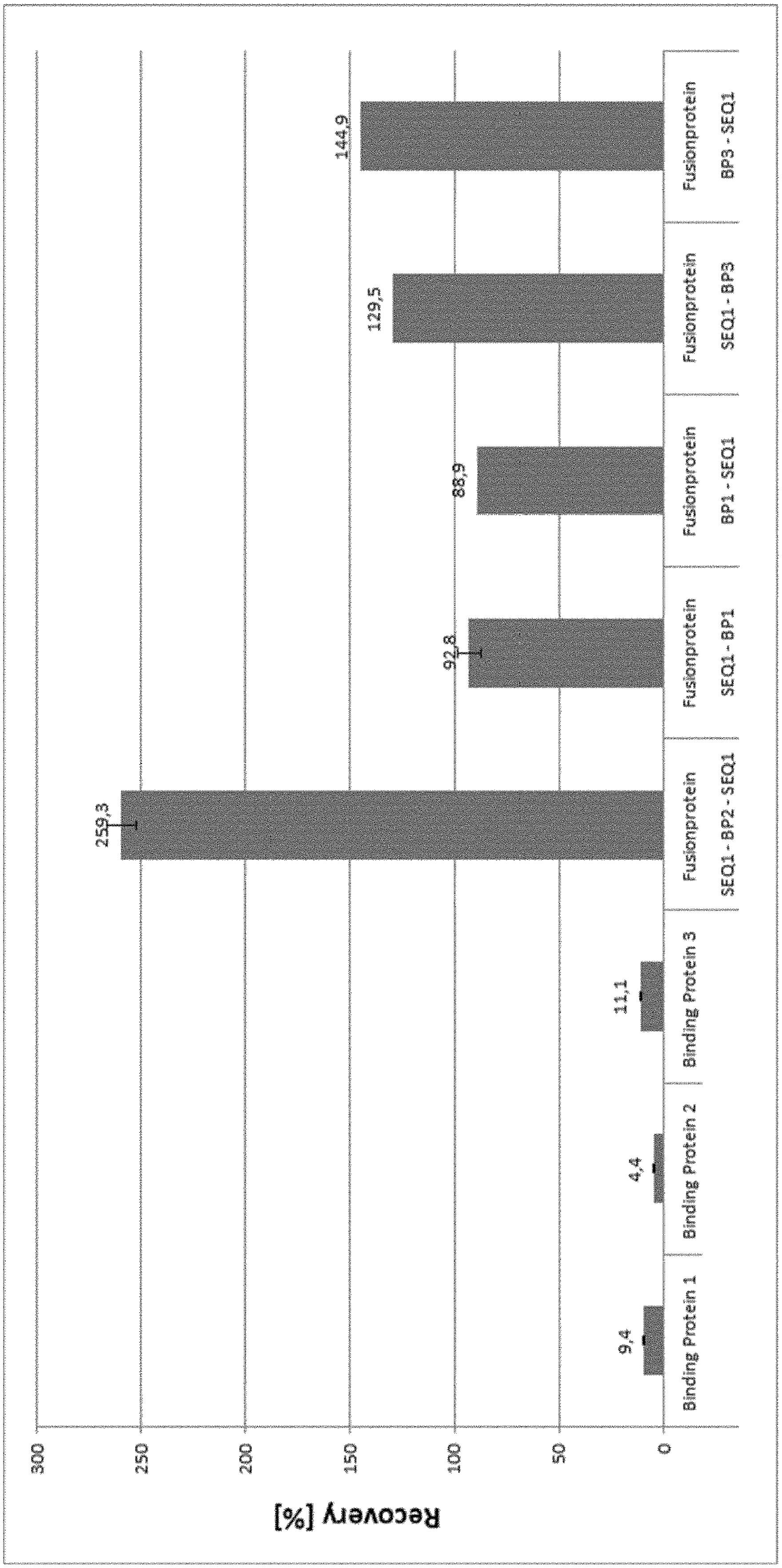

SEQUENCE LISTING

```
<160> NUMBER OF SEQ ID NOS: 34

<210> SEQ ID NO 1
<211> LENGTH: 58
<212> TYPE: PRT
<213> ORGANISM: Artificial Sequence
```

<220> FEATURE:
<223> OTHER INFORMATION: PAdelFc (27+ with 10S, 13D, 14S, 31R, 35S)

<400> SEQUENCE: 1

Ile Ala Ala Lys Phe Asp Glu Ala Gln Ser Ala Ala Asp Ser Glu Ile
1 5 10 15

Leu His Leu Pro Asn Leu Thr Glu Glu Gln Arg Asn Ala Phe Arg Gln
20 25 30

Ser Leu Ser Asp Asp Pro Ser Val Ser Leu Glu Val Leu Gly Glu Ala
35 40 45

Gln Lys Leu Asn Asp Ser Gln Ala Pro Lys
50 55

<210> SEQ ID NO 2
<211> LENGTH: 58
<212> TYPE: PRT
<213> ORGANISM: Artificial Sequence
<220> FEATURE:
<223> OTHER INFORMATION: PAdelFc (27+ with 13D 31R)

<400> SEQUENCE: 2

Ile Ala Ala Lys Phe Asp Glu Ala Gln Gln Ala Ala Asp Tyr Glu Ile
1 5 10 15

Leu His Leu Pro Asn Leu Thr Glu Glu Gln Arg Asn Ala Phe Arg Gln
20 25 30

Ser Leu Arg Asp Asp Pro Ser Val Ser Leu Glu Val Leu Gly Glu Ala
35 40 45

Gln Lys Leu Asn Asp Ser Gln Ala Pro Lys
50 55

<210> SEQ ID NO 3
<211> LENGTH: 58
<212> TYPE: PRT
<213> ORGANISM: Artificial Sequence
<220> FEATURE:
<223> OTHER INFORMATION: PAdelFc (27+ with 13D 31R 35S)

<400> SEQUENCE: 3

Ile Ala Ala Lys Phe Asp Glu Ala Gln Gln Ala Ala Asp Tyr Glu Ile
1 5 10 15

Leu His Leu Pro Asn Leu Thr Glu Glu Gln Arg Asn Ala Phe Arg Gln
20 25 30

Ser Leu Ser Asp Asp Pro Ser Val Ser Leu Glu Val Leu Gly Glu Ala
35 40 45

Gln Lys Leu Asn Asp Ser Gln Ala Pro Lys
50 55

<210> SEQ ID NO 4
<211> LENGTH: 58
<212> TYPE: PRT
<213> ORGANISM: Artificial Sequence
<220> FEATURE:
<223> OTHER INFORMATION: PAdelFc (27+ with 10S 13D 31R)

<400> SEQUENCE: 4

Ile Ala Ala Lys Phe Asp Glu Ala Gln Ser Ala Ala Asp Tyr Glu Ile
1 5 10 15

Leu His Leu Pro Asn Leu Thr Glu Glu Gln Arg Asn Ala Phe Arg Gln
20 25 30

Ser Leu Arg Asp Asp Pro Ser Val Ser Leu Glu Val Leu Gly Glu Ala
35 40 45

```
Gln Lys Leu Asn Asp Ser Gln Ala Pro Lys
    50                  55


<210> SEQ ID NO 5
<211> LENGTH: 58
<212> TYPE: PRT
<213> ORGANISM: Artificial Sequence
<220> FEATURE:
<223> OTHER INFORMATION: #PAdelFc (27+ with 10S 13D 31R 35S)

<400> SEQUENCE: 5

Ile Ala Ala Lys Phe Asp Glu Ala Gln Ser Ala Ala Asp Tyr Glu Ile
1               5                   10                  15

Leu His Leu Pro Asn Leu Thr Glu Glu Gln Arg Asn Ala Phe Arg Gln
            20                  25                  30

Ser Leu Ser Asp Asp Pro Ser Val Ser Leu Glu Val Leu Gly Glu Ala
        35                  40                  45

Gln Lys Leu Asn Asp Ser Gln Ala Pro Lys
    50                  55


<210> SEQ ID NO 6
<211> LENGTH: 58
<212> TYPE: PRT
<213> ORGANISM: Artificial Sequence
<220> FEATURE:
<223> OTHER INFORMATION: PAdelFc (27+ with 13D 14S 31R)

<400> SEQUENCE: 6

Ile Ala Ala Lys Phe Asp Glu Ala Gln Gln Ala Ala Asp Ser Glu Ile
1               5                   10                  15

Leu His Leu Pro Asn Leu Thr Glu Glu Gln Arg Asn Ala Phe Arg Gln
            20                  25                  30

Ser Leu Arg Asp Asp Pro Ser Val Ser Leu Glu Val Leu Gly Glu Ala
        35                  40                  45

Gln Lys Leu Asn Asp Ser Gln Ala Pro Lys
    50                  55


<210> SEQ ID NO 7
<211> LENGTH: 58
<212> TYPE: PRT
<213> ORGANISM: Artificial Sequence
<220> FEATURE:
<223> OTHER INFORMATION: PAdelFc (27+ with 10S 13D 14S 31R)

<400> SEQUENCE: 7

Ile Ala Ala Lys Phe Asp Glu Ala Gln Ser Ala Ala Asp Ser Glu Ile
1               5                   10                  15

Leu His Leu Pro Asn Leu Thr Glu Glu Gln Arg Asn Ala Phe Arg Gln
            20                  25                  30

Ser Leu Arg Asp Asp Pro Ser Val Ser Leu Glu Val Leu Gly Glu Ala
        35                  40                  45

Gln Lys Leu Asn Asp Ser Gln Ala Pro Lys
    50                  55


<210> SEQ ID NO 8
<211> LENGTH: 58
<212> TYPE: PRT
<213> ORGANISM: Artificial Sequence
<220> FEATURE:
<223> OTHER INFORMATION: PAdelFc (27+ with 13D 14S 31R 35S)

<400> SEQUENCE: 8
```

```
Ile Ala Ala Lys Phe Asp Glu Ala Gln Gln Ala Ala Asp Ser Glu Ile
1               5                   10                  15

Leu His Leu Pro Asn Leu Thr Glu Glu Gln Arg Asn Ala Phe Arg Gln
            20                  25                  30

Ser Leu Ser Asp Asp Pro Ser Val Ser Leu Glu Val Leu Gly Glu Ala
        35                  40                  45

Gln Lys Leu Asn Asp Ser Gln Ala Pro Lys
    50                  55


<210> SEQ ID NO 9
<211> LENGTH: 58
<212> TYPE: PRT
<213> ORGANISM: Artificial Sequence
<220> FEATURE:
<223> OTHER INFORMATION: PAdelFc (27 with 10S, 13D, 14S, 31R, 35S)

<400> SEQUENCE: 9

Asn Ala Ala Lys Phe Asp Glu Ala Gln Ser Ser Ala Asp Ser Glu Ile
1               5                   10                  15

Leu His Leu Pro Asn Leu Thr Glu Glu Gln Arg Asn Ala Phe Arg Gln
            20                  25                  30

Ser Leu Ser Asp Asp Pro Ser Val Ser Lys Glu Val Leu Gly Glu Ala
        35                  40                  45

Gln Lys Leu Asn Asp Ser Gln Ala Pro Lys
    50                  55


<210> SEQ ID NO 10
<211> LENGTH: 58
<212> TYPE: PRT
<213> ORGANISM: Artificial Sequence
<220> FEATURE:
<223> OTHER INFORMATION: PAdelFc (14+ with 13D, 31R)

<400> SEQUENCE: 10

Ile Ala Ala Lys His Asp Lys Asp Gln Gln Ala Ala Asp Tyr Glu Ile
1               5                   10                  15

Leu His Leu Pro Asn Leu Thr Glu Asp Gln Arg Asn Ala Phe Arg Gln
            20                  25                  30

Ser Leu Arg Asp Asp Pro Ser Val Ser Leu Glu Ile Leu Gly Glu Ala
        35                  40                  45

Lys Lys Leu Asn Asp Ala Gln Ala Pro Pro
    50                  55


<210> SEQ ID NO 11
<211> LENGTH: 58
<212> TYPE: PRT
<213> ORGANISM: Artificial Sequence
<220> FEATURE:
<223> OTHER INFORMATION: PAdelFc (14+ with 10S, 13D, 14S, 31R, 35S)

<400> SEQUENCE: 11

Ile Ala Ala Lys His Asp Lys Asp Gln Ser Ala Ala Asp Ser Glu Ile
1               5                   10                  15

Leu His Leu Pro Asn Leu Thr Glu Asp Gln Arg Asn Ala Phe Arg Gln
            20                  25                  30

Ser Leu Ser Asp Asp Pro Ser Val Ser Leu Glu Ile Leu Gly Glu Ala
        35                  40                  45

Lys Lys Leu Asn Asp Ala Gln Ala Pro Pro
    50                  55
```

<210> SEQ ID NO 12
<211> LENGTH: 58
<212> TYPE: PRT
<213> ORGANISM: Artificial Sequence
<220> FEATURE:
<223> OTHER INFORMATION: PAdelFc (50+ with 13D 31R)

<400> SEQUENCE: 12

```
Ile Asp Ala Lys Phe Asp Glu Ala Gln Gln Ala Ala Asp Tyr Glu Ile
1               5                   10                  15

Leu His Leu Pro Asn Leu Thr Glu Asp Gln Arg Asn Ala Phe Arg Gln
            20                  25                  30

Ser Leu Arg Asp Asp Pro Ser Val Ser Leu Ser Leu Leu Ala Glu Ala
        35                  40                  45

Lys Lys Leu Asn Asp Ala Gln Ala Pro Pro
    50                  55
```

<210> SEQ ID NO 13
<211> LENGTH: 58
<212> TYPE: PRT
<213> ORGANISM: Artificial Sequence
<220> FEATURE:
<223> OTHER INFORMATION: PAdelFc (50+ with 10S, 13D, 14S, 31R, 35S)

<400> SEQUENCE: 13

```
Ile Asp Ala Lys Phe Asp Glu Ala Gln Ser Ala Ala Asp Ser Glu Ile
1               5                   10                  15

Leu His Leu Pro Asn Leu Thr Glu Asp Gln Arg Asn Ala Phe Arg Gln
            20                  25                  30

Ser Leu Ser Asp Asp Pro Ser Val Ser Leu Ser Leu Leu Ala Glu Ala
        35                  40                  45

Lys Lys Leu Asn Asp Ala Gln Ala Pro Pro
    50                  55
```

<210> SEQ ID NO 14
<211> LENGTH: 58
<212> TYPE: PRT
<213> ORGANISM: Artificial Sequence
<220> FEATURE:
<223> OTHER INFORMATION: PAdelFc (54+ with 13D 31R)

<400> SEQUENCE: 14

```
Ile Asp Ala Gln His Asp Glu Asp Gln Gln Ala Ala Asp Tyr Glu Ile
1               5                   10                  15

Leu His Leu Pro Asn Leu Thr Glu Glu Gln Arg Asn Ala Phe Arg Gln
            20                  25                  30

Ser Leu Arg Asp Asp Pro Ser Gln Ser Leu Glu Ile Leu Ala Glu Ala
        35                  40                  45

Lys Lys Leu Asn Glu Ser Gln Ala Pro Lys
    50                  55
```

<210> SEQ ID NO 15
<211> LENGTH: 58
<212> TYPE: PRT
<213> ORGANISM: Artificial Sequence
<220> FEATURE:
<223> OTHER INFORMATION: PAdelFc (54+ with 10S, 13D, 14S, 31R, 35S)

<400> SEQUENCE: 15

```
Ile Asp Ala Gln His Asp Glu Asp Gln Ser Ala Ala Asp Ser Glu Ile
1               5                   10                  15
```

-continued

```
Leu His Leu Pro Asn Leu Thr Glu Glu Gln Arg Asn Ala Phe Arg Gln
            20                  25                  30

Ser Leu Ser Asp Asp Pro Ser Gln Ser Leu Glu Ile Leu Ala Glu Ala
        35                  40                  45

Lys Lys Leu Asn Glu Ser Gln Ala Pro Lys
    50                  55


<210> SEQ ID NO 16
<211> LENGTH: 58
<212> TYPE: PRT
<213> ORGANISM: Artificial Sequence
<220> FEATURE:
<223> OTHER INFORMATION: 27+

<400> SEQUENCE: 16

Ile Ala Ala Lys Phe Asp Glu Ala Gln Gln Ala Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Arg Asp Asp Pro Ser Val Ser Leu Glu Val Leu Gly Glu Ala
        35                  40                  45

Gln Lys Leu Asn Asp Ser Gln Ala Pro Lys
    50                  55


<210> SEQ ID NO 17
<211> LENGTH: 58
<212> TYPE: PRT
<213> ORGANISM: Artificial Sequence
<220> FEATURE:
<223> OTHER INFORMATION: 27

<400> SEQUENCE: 17

Asn Ala Ala Lys Phe Asp Glu Ala Gln Gln Ser Ala Phe Tyr Glu Ile
1               5                   10                  15

Leu His Leu Pro Asn Leu Thr Glu Glu Gln Arg Asn Ala Phe Ile Gln
            20                  25                  30

Ser Leu Lys Asp Asp Pro Ser Val Ser Lys Glu Val Leu Gly Glu Ala
        35                  40                  45

Gln Lys Leu Asn Asp Ser Gln Ala Pro Lys
    50                  55


<210> SEQ ID NO 18
<211> LENGTH: 218
<212> TYPE: PRT
<213> ORGANISM: Artificial Sequence
<220> FEATURE:
<223> OTHER INFORMATION: IgG1 Fc region

<400> SEQUENCE: 18

Pro Ala Pro Glu Leu Leu Gly Gly Pro Ser Val Phe Leu Phe Pro Pro
1               5                   10                  15

Lys Pro Lys Asp Thr Leu Met Ile Ser Arg Thr Pro Glu Val Thr Cys
            20                  25                  30

Val Val Val Asp Val Ser His Glu Asp Pro Glu Val Lys Phe Asn Trp
        35                  40                  45

Tyr Val Asp Gly Val Glu Val His Asn Ala Lys Thr Lys Pro Arg Glu
    50                  55                  60

Glu Gln Tyr Asn Ser Thr Tyr Arg Val Val Ser Val Leu Thr Val Leu
65                  70                  75                  80

His Gln Asp Trp Leu Asn Gly Lys Glu Tyr Lys Cys Lys Val Ser Asn
```

```
                85                  90                  95

Lys Ala Leu Pro Ala Pro Ile Glu Lys Thr Ile Ser Lys Ala Lys Gly
            100                 105                 110

Gln Pro Arg Glu Pro Gln Val Tyr Thr Leu Pro Pro Ser Arg Glu Glu
        115                 120                 125

Met Thr Lys Asn Gln Val Ser Leu Thr Cys Leu Val Lys Gly Phe Tyr
    130                 135                 140

Pro Ser Asp Ile Ala Val Glu Trp Glu Ser Asn Gly Gln Pro Glu Asn
145                 150                 155                 160

Asn Tyr Lys Thr Thr Pro Pro Val Leu Asp Ser Asp Gly Ser Phe Phe
                165                 170                 175

Leu Tyr Ser Lys Leu Thr Val Asp Lys Ser Arg Trp Gln Gln Gly Asn
            180                 185                 190

Val Phe Ser Cys Ser Val Met His Glu Ala Leu His Asn His Tyr Thr
        195                 200                 205

Gln Lys Ser Leu Ser Leu Ser Pro Gly Lys
    210                 215


<210> SEQ ID NO 19
<211> LENGTH: 218
<212> TYPE: PRT
<213> ORGANISM: Artificial Sequence
<220> FEATURE:
<223> OTHER INFORMATION: IgG1 Fc

<400> SEQUENCE: 19

Pro Ala Pro Glu Leu Leu Gly Gly Pro Ser Val Phe Leu Phe Pro Pro
1               5                   10                  15

Lys Pro Lys Asp Thr Leu Met Ile Ser Arg Thr Pro Glu Val Thr Cys
            20                  25                  30

Val Val Val Asp Val Ser His Glu Asp Pro Glu Val Lys Phe Asn Trp
        35                  40                  45

Tyr Val Asp Gly Val Glu Val His Asn Ala Lys Thr Lys Pro Arg Glu
    50                  55                  60

Glu Gln Tyr Asn Ser Thr Tyr Arg Val Val Ser Val Leu Thr Val Leu
65                  70                  75                  80

His Gln Asp Trp Leu Asn Gly Lys Glu Tyr Lys Cys Lys Val Ser Asn
                85                  90                  95

Lys Ala Leu Pro Ala Pro Ile Glu Lys Thr Ile Ser Lys Ala Lys Gly
            100                 105                 110

Gln Pro Arg Glu Pro Gln Val Tyr Thr Leu Pro Pro Ser Arg Asp Glu
        115                 120                 125

Leu Thr Lys Asn Gln Val Ser Leu Thr Cys Leu Val Lys Gly Phe Tyr
    130                 135                 140

Pro Ser Asp Ile Ala Val Glu Trp Glu Ser Asn Gly Gln Pro Glu Asn
145                 150                 155                 160

Asn Tyr Lys Thr Thr Pro Pro Val Leu Asp Ser Asp Gly Ser Phe Phe
                165                 170                 175

Leu Tyr Ser Lys Leu Thr Val Asp Lys Ser Arg Trp Gln Gln Gly Asn
            180                 185                 190

Val Phe Ser Cys Ser Val Met His Glu Ala Leu His Asn His Tyr Thr
        195                 200                 205

Gln Lys Ser Leu Ser Leu Ser Pro Gly Lys
    210                 215
```

<210> SEQ ID NO 20
<211> LENGTH: 58
<212> TYPE: PRT
<213> ORGANISM: Artificial Sequence
<220> FEATURE:
<223> OTHER INFORMATION: domain C

<400> SEQUENCE: 20

```
Ala Asp Asn Lys Phe Asn Lys Glu Gln Gln Asn Ala Phe Tyr Glu Ile
1               5                   10                  15

Leu His Leu Pro Asn Leu Thr Glu Glu Gln Arg Asn Gly Phe Ile Gln
            20                  25                  30

Ser Leu Lys Asp Asp Pro Ser Val Ser Lys Glu Ile Leu Ala Glu Ala
        35                  40                  45

Lys Lys Leu Asn Asp Ala Gln Ala Pro Lys
    50                  55
```

<210> SEQ ID NO 21
<211> LENGTH: 58
<212> TYPE: PRT
<213> ORGANISM: Artificial Sequence
<220> FEATURE:
<223> OTHER INFORMATION: domain A

<400> SEQUENCE: 21

```
Ala Asp Asn Asn Phe Asn Lys Glu Gln Gln Asn Ala Phe Tyr Glu Ile
1               5                   10                  15

Leu Asn Met Pro Asn Leu Asn Glu Glu Gln Arg Asn Gly Phe Ile Gln
            20                  25                  30

Ser Leu Lys Asp Asp Pro Ser Gln Ser Ala Asn Leu Leu Ala Glu Ala
        35                  40                  45

Lys Lys Leu Asn Glu Ser Gln Ala Pro Lys
    50                  55
```

<210> SEQ ID NO 22
<211> LENGTH: 58
<212> TYPE: PRT
<213> ORGANISM: Artificial Sequence
<220> FEATURE:
<223> OTHER INFORMATION: domain Z

<400> SEQUENCE: 22

```
Val Asp Asn Lys Phe Asn Lys Glu Gln Gln Asn Ala Phe Tyr Glu Ile
1               5                   10                  15

Leu His Leu Pro Asn Leu Asn Glu Glu Gln Arg Asn Ala Phe Ile Gln
            20                  25                  30

Ser Leu Lys Asp Asp Pro Ser Gln Ser Ala Asn Leu Leu Ala Glu Ala
        35                  40                  45

Lys Lys Leu Asn Asp Ala Gln Ala Pro Lys
    50                  55
```

<210> SEQ ID NO 23
<211> LENGTH: 58
<212> TYPE: PRT
<213> ORGANISM: Artificial Sequence
<220> FEATURE:
<223> OTHER INFORMATION: PAdelFc (24+ 13D 31R)

<400> SEQUENCE: 23

```
Ile Ala Ala Gln His Asp Lys Glu Gln Gln Ala Ala Asp Tyr Glu Ile
1               5                   10                  15

Leu His Leu Pro Asn Leu Thr Glu Asp Gln Arg Asn Ala Phe Arg Gln
```

```
            20                  25                  30

Ser Leu Arg Asp Asp Pro Ser Val Ser Leu Glu Ile Leu Gly Glu Ala
        35                  40                  45

Lys Lys Leu Asn Asp Ala Gln Ala Pro Lys
    50                  55


<210> SEQ ID NO 24
<211> LENGTH: 58
<212> TYPE: PRT
<213> ORGANISM: Artificial Sequence
<220> FEATURE:
<223> OTHER INFORMATION: PAdelFc (24+ 10S 13D 14S 31R 35S)

<400> SEQUENCE: 24

Ile Ala Ala Gln His Asp Lys Glu Gln Ser Ala Ala Asp Ser Glu Ile
1               5                   10                  15

Leu His Leu Pro Asn Leu Thr Glu Asp Gln Arg Asn Ala Phe Arg Gln
            20                  25                  30

Ser Leu Ser Asp Asp Pro Ser Val Ser Leu Glu Ile Leu Gly Glu Ala
        35                  40                  45

Lys Lys Leu Asn Asp Ala Gln Ala Pro Lys
    50                  55


<210> SEQ ID NO 25
<211> LENGTH: 58
<212> TYPE: PRT
<213> ORGANISM: Artificial Sequence
<220> FEATURE:
<223> OTHER INFORMATION: PAdelFc (26+ 13D 31R)

<400> SEQUENCE: 25

Ile Ala Ala Gln His Asp Lys Asp Gln Gln Ala Ala Asp Tyr Glu Ile
1               5                   10                  15

Leu His Leu Pro Asn Leu Thr Glu Glu Gln Arg Asn Ala Phe Arg Gln
            20                  25                  30

Ser Leu Arg Asp Asp Pro Ser Val Ser Leu Glu Ile Leu Ala Glu Ala
        35                  40                  45

Lys Lys Leu Asn Asp Ala Gln Ala Pro Lys
    50                  55


<210> SEQ ID NO 26
<211> LENGTH: 58
<212> TYPE: PRT
<213> ORGANISM: Artificial Sequence
<220> FEATURE:
<223> OTHER INFORMATION: PAdelFc (26+ 10S 13D 14S 31R 35S)

<400> SEQUENCE: 26

Ile Ala Ala Gln His Asp Lys Asp Gln Ser Ala Ala Asp Ser Glu Ile
1               5                   10                  15

Leu His Leu Pro Asn Leu Thr Glu Glu Gln Arg Asn Ala Phe Arg Gln
            20                  25                  30

Ser Leu Ser Asp Asp Pro Ser Val Ser Leu Glu Ile Leu Ala Glu Ala
        35                  40                  45

Lys Lys Leu Asn Asp Ala Gln Ala Pro Lys
    50                  55


<210> SEQ ID NO 27
<211> LENGTH: 58
<212> TYPE: PRT
<213> ORGANISM: Artificial Sequence
```

<220> FEATURE:
<223> OTHER INFORMATION: PAdelFc (60+ 13D 31R)

<400> SEQUENCE: 27

```
Ile Asp Ala Lys Phe Asp Glu Ala Ala Gln Ala Ala Asp Tyr Glu Ile
1               5                   10                  15

Leu His Leu Pro Asn Leu Thr Glu Asp Gln Arg Asn Ala Phe Arg Gln
            20                  25                  30

Ser Leu Arg Asp Asp Pro Ser Val Ser Leu Ala Leu Leu Ala Glu Ala
        35                  40                  45

Lys Lys Leu Asn Asp Ala Gln Ala Pro Pro
    50                  55
```

<210> SEQ ID NO 28
<211> LENGTH: 58
<212> TYPE: PRT
<213> ORGANISM: Artificial Sequence
<220> FEATURE:
<223> OTHER INFORMATION: PAdelFc (60+ with 10S, 13D, 14S, 31R, 35S)

<400> SEQUENCE: 28

```
Ile Asp Ala Lys Phe Asp Glu Ala Ala Ser Ala Ala Asp Ser Glu Ile
1               5                   10                  15

Leu His Leu Pro Asn Leu Thr Glu Asp Gln Arg Asn Ala Phe Arg Gln
            20                  25                  30

Ser Leu Ser Asp Asp Pro Ser Val Ser Leu Ala Leu Leu Ala Glu Ala
        35                  40                  45

Lys Lys Leu Asn Asp Ala Gln Ala Pro Pro
    50                  55
```

<210> SEQ ID NO 29
<211> LENGTH: 58
<212> TYPE: PRT
<213> ORGANISM: Artificial Sequence
<220> FEATURE:
<223> OTHER INFORMATION: PAdelFc (59+ 13D 31R)

<400> SEQUENCE: 29

```
Ile Asp Ala Lys Phe Asp Glu Ala Gln Gln Ala Ala Asp Tyr Glu Ile
1               5                   10                  15

Leu His Leu Pro Asn Leu Thr Glu Asp Gln Arg Asn Ala Phe Arg Gln
            20                  25                  30

Ser Leu Arg Asp Asp Pro Ser Val Ser Leu Ala Leu Leu Ala Glu Ala
        35                  40                  45

Lys Lys Leu Asn Asp Ala Gln Ala Pro Pro
    50                  55
```

<210> SEQ ID NO 30
<211> LENGTH: 58
<212> TYPE: PRT
<213> ORGANISM: Artificial Sequence
<220> FEATURE:
<223> OTHER INFORMATION: PAdelFc (59+ with 10S, 13D, 14S, 31R, 35S)

<400> SEQUENCE: 30

```
Ile Asp Ala Lys Phe Asp Glu Ala Gln Ser Ala Ala Asp Ser Glu Ile
1               5                   10                  15

Leu His Leu Pro Asn Leu Thr Glu Asp Gln Arg Asn Ala Phe Arg Gln
            20                  25                  30

Ser Leu Ser Asp Asp Pro Ser Val Ser Leu Ala Leu Leu Ala Glu Ala
        35                  40                  45
```

Lys Lys Leu Asn Asp Ala Gln Ala Pro Pro
50 55

<210> SEQ ID NO 31
<211> LENGTH: 58
<212> TYPE: PRT
<213> ORGANISM: Artificial Sequence
<220> FEATURE:
<223> OTHER INFORMATION: PA02
<220> FEATURE:
<221> NAME/KEY: Xaa
<222> LOCATION: (25)..(25)
<223> OTHER INFORMATION: can be any amino acid except C, G, N, P
<220> FEATURE:
<221> NAME/KEY: Xaa
<222> LOCATION: (26)..(26)
<223> OTHER INFORMATION: can be any amino acid except C, G, N, P
<220> FEATURE:
<221> NAME/KEY: Xaa
<222> LOCATION: (28)..(28)
<223> OTHER INFORMATION: can be any amino acid except C, G, N, P
<220> FEATURE:
<221> NAME/KEY: Xaa
<222> LOCATION: (29)..(29)
<223> OTHER INFORMATION: can be any amino acid except C, G, N, P
<220> FEATURE:
<221> NAME/KEY: Xaa
<222> LOCATION: (30)..(30)
<223> OTHER INFORMATION: F, H, or Y
<220> FEATURE:
<221> NAME/KEY: Xaa
<222> LOCATION: (32)..(32)
<223> OTHER INFORMATION: can be any amino acid except C, G, N, P
<220> FEATURE:
<221> NAME/KEY: Xaa
<222> LOCATION: (33)..(33)
<223> OTHER INFORMATION: can be any amino acid except C, G, N, P
<220> FEATURE:
<221> NAME/KEY: Xaa
<222> LOCATION: (35)..(35)
<223> OTHER INFORMATION: can be any amino acid except C, G, N, P
<220> FEATURE:
<221> NAME/KEY: Xaa
<222> LOCATION: (36)..(36)
<223> OTHER INFORMATION: can be any amino acid except C, G, N, P
<220> FEATURE:
<221> NAME/KEY: Xaa
<222> LOCATION: (42)..(42)
<223> OTHER INFORMATION: can be any amino acid except C, G, N, P
<220> FEATURE:
<221> NAME/KEY: Xaa
<222> LOCATION: (43)..(43)
<223> OTHER INFORMATION: can be any amino acid except C, G, N, P
<220> FEATURE:
<221> NAME/KEY: Xaa
<222> LOCATION: (44)..(44)
<223> OTHER INFORMATION: I, L, T, or V
<220> FEATURE:
<221> NAME/KEY: Xaa
<222> LOCATION: (46)..(46)
<223> OTHER INFORMATION: can be any amino acid except C, G, N, P
<220> FEATURE:
<221> NAME/KEY: Xaa
<222> LOCATION: (47)..(47)
<223> OTHER INFORMATION: can be any amino acid except C, G, N, P
<220> FEATURE:
<221> NAME/KEY: Xaa
<222> LOCATION: (50)..(50)
<223> OTHER INFORMATION: can be any amino acid except C, G, N, P
<220> FEATURE:
<221> NAME/KEY: Xaa
<222> LOCATION: (54)..(54)
<223> OTHER INFORMATION: can be any amino acid except C, G, N, P

<400> SEQUENCE: 31

Ile Ala Ala Lys Phe Asp Glu Ala Gln Ser Ala Ala Asp Ser Glu Ile

-continued

```
1               5                   10                  15

Leu His Leu Pro Asn Leu Thr Glu Xaa Xaa Arg Xaa Xaa Xaa Arg Xaa
            20                  25                  30

Xaa Leu Xaa Xaa Asp Pro Ser Val Ser Xaa Xaa Xaa Leu Xaa Xaa Ala
        35                  40                  45

Gln Xaa Leu Asn Asp Xaa Gln Ala Pro Lys
    50                  55


<210> SEQ ID NO 32
<211> LENGTH: 58
<212> TYPE: PRT
<213> ORGANISM: Artificial Sequence
<220> FEATURE:
<223> OTHER INFORMATION: PA12
<220> FEATURE:
<221> NAME/KEY: Xaa
<222> LOCATION: (25)..(25)
<223> OTHER INFORMATION: H, E, V, A, L, Y, W, K, I, Q, T, or R
<220> FEATURE:
<221> NAME/KEY: Xaa
<222> LOCATION: (29)..(29)
<223> OTHER INFORMATION: H, E, V, A, L, Y, W, K, I, Q, T, or R
<220> FEATURE:
<221> NAME/KEY: Xaa
<222> LOCATION: (33)..(33)
<223> OTHER INFORMATION: H, E, V, A, L, Y, W, K, I, Q, T, or R
<220> FEATURE:
<221> NAME/KEY: Xaa
<222> LOCATION: (36)..(36)
<223> OTHER INFORMATION: H, E, V, A, L, Y, W, K, I, Q, T, or R
<220> FEATURE:
<221> NAME/KEY: Xaa
<222> LOCATION: (37)..(37)
<223> OTHER INFORMATION: H, E, V, A, L, Y, W, K, I, Q, T, or R
<220> FEATURE:
<221> NAME/KEY: Xaa
<222> LOCATION: (43)..(43)
<223> OTHER INFORMATION: H, E, V, A, L, Y, W, K, I, Q, T, or R
<220> FEATURE:
<221> NAME/KEY: Xaa
<222> LOCATION: (46)..(46)
<223> OTHER INFORMATION: H, E, V, A, L, Y, W, K, I, Q, T, or R
<220> FEATURE:
<221> NAME/KEY: Xaa
<222> LOCATION: (47)..(47)
<223> OTHER INFORMATION: H, E, V, A, L, Y, W, K, I, Q, T, or R
<220> FEATURE:
<221> NAME/KEY: Xaa
<222> LOCATION: (50)..(50)
<223> OTHER INFORMATION: H, E, V, A, L, Y, W, K, I, Q, T, or R
<220> FEATURE:
<221> NAME/KEY: Xaa
<222> LOCATION: (51)..(51)
<223> OTHER INFORMATION: H, E, V, A, L, Y, W, K, I, Q, T, or R
<220> FEATURE:
<221> NAME/KEY: Xaa
<222> LOCATION: (54)..(54)
<223> OTHER INFORMATION: H, E, V, A, L, Y, W, K, I, Q, T, or R

<400> SEQUENCE: 32

Ile Ala Ala Lys Phe Asp Glu Ala Gln Ser Ala Ala Asp Ser Glu Ile
1               5                   10                  15

Leu His Leu Pro Asn Leu Thr Glu Xaa Gln Arg Asn Xaa Phe Arg Gln
            20                  25                  30

Xaa Leu Ser Xaa Xaa Pro Ser Val Ser Leu Xaa Val Leu Xaa Xaa Ala
        35                  40                  45

Gln Xaa Xaa Asn Asp Xaa Gln Ala Pro Lys
    50                  55


<210> SEQ ID NO 33
```

```
<211> LENGTH: 58
<212> TYPE: PRT
<213> ORGANISM: Artificial Sequence
<220> FEATURE:
<223> OTHER INFORMATION: PA03
<220> FEATURE:
<221> NAME/KEY: Xaa
<222> LOCATION: (7)..(7)
<223> OTHER INFORMATION: A, L, M, F, W, K, Q, E, S, V, I, Y, H, R, D, or
      T
<220> FEATURE:
<221> NAME/KEY: Xaa
<222> LOCATION: (8)..(8)
<223> OTHER INFORMATION: A, L, M, F, W, K, Q, E, S, V, I, Y, H, R, D, or
      T
<220> FEATURE:
<221> NAME/KEY: Xaa
<222> LOCATION: (10)..(10)
<223> OTHER INFORMATION: A, L, M, F, W, K, Q, E, S, V, I, Y, H, R, D, or
      T
<220> FEATURE:
<221> NAME/KEY: Xaa
<222> LOCATION: (11)..(11)
<223> OTHER INFORMATION: A, L, M, F, W, K, Q, E, S, V, I, Y, H, R, D, or
      T
<220> FEATURE:
<221> NAME/KEY: Xaa
<222> LOCATION: (14)..(14)
<223> OTHER INFORMATION: A, L, M, F, W, K, Q, E, S, V, I, Y, H, R, D, or
      T
<220> FEATURE:
<221> NAME/KEY: Xaa
<222> LOCATION: (15)..(15)
<223> OTHER INFORMATION: A, L, M, F, W, K, Q, E, S, V, I, Y, H, R, D, or
      T
<220> FEATURE:
<221> NAME/KEY: Xaa
<222> LOCATION: (18)..(18)
<223> OTHER INFORMATION: A, L, M, F, W, K, Q, E, S, V, I, Y, H, R, D, or
      T
<220> FEATURE:
<221> NAME/KEY: Xaa
<222> LOCATION: (20)..(20)
<223> OTHER INFORMATION: A, L, M, F, W, K, Q, E, S, V, I, Y, H, R, D, or
      T
<220> FEATURE:
<221> NAME/KEY: Xaa
<222> LOCATION: (42)..(42)
<223> OTHER INFORMATION: A, L, M, F, W, K, Q, E, S, V, I, Y, H, R, D, or
      T
<220> FEATURE:
<221> NAME/KEY: Xaa
<222> LOCATION: (43)..(43)
<223> OTHER INFORMATION: A, L, M, F, W, K, Q, E, S, V, I, Y, H, R, D, or
      T
<220> FEATURE:
<221> NAME/KEY: Xaa
<222> LOCATION: (46)..(46)
<223> OTHER INFORMATION: A, L, M, F, W, K, Q, E, S, V, I, Y, H, R, D, or
      T
<220> FEATURE:
<221> NAME/KEY: Xaa
<222> LOCATION: (47)..(47)
<223> OTHER INFORMATION: A, L, M, F, W, K, Q, E, S, V, I, Y, H, R, D, or
      T
<220> FEATURE:
<221> NAME/KEY: Xaa
<222> LOCATION: (49)..(49)
<223> OTHER INFORMATION: A, L, M, F, W, K, Q, E, S, V, I, Y, H, R, D, or
      T
<220> FEATURE:
<221> NAME/KEY: Xaa
<222> LOCATION: (50)..(50)
<223> OTHER INFORMATION: A, L, M, F, W, K, Q, E, S, V, I, Y, H, R, D, or
      T
<220> FEATURE:
<221> NAME/KEY: Xaa
<222> LOCATION: (53)..(53)
<223> OTHER INFORMATION: A, L, M, F, W, K, Q, E, S, V, I, Y, H, R, D, or
```

```
      T
<220> FEATURE:
<221> NAME/KEY: Xaa
<222> LOCATION: (54)..(54)
<223> OTHER INFORMATION: A, L, M, F, W, K, Q, E, S, V, I, Y, H, R, D, or
      T

<400> SEQUENCE: 33

Ile Ala Ala Lys Phe Asp Xaa Xaa Gln Xaa Xaa Ala Asp Xaa Xaa Ile
1               5                   10                  15

Leu Xaa Leu Xaa Asn Leu Thr Glu Glu Gln Arg Asn Ala Phe Arg Gln
            20                  25                  30

Ser Leu Ser Asp Asp Pro Ser Val Ser Xaa Xaa Val Leu Xaa Xaa Ala
        35                  40                  45

Xaa Xaa Leu Asn Xaa Xaa Gln Ala Pro Lys
    50                  55


<210> SEQ ID NO 34
<211> LENGTH: 58
<212> TYPE: PRT
<213> ORGANISM: Artificial Sequence
<220> FEATURE:
<223> OTHER INFORMATION: PA13
<220> FEATURE:
<221> NAME/KEY: Xaa
<222> LOCATION: (7)..(7)
<223> OTHER INFORMATION: H, E, V, A, L, Y, W, K, I, Q, T, or R
<220> FEATURE:
<221> NAME/KEY: Xaa
<222> LOCATION: (8)..(8)
<223> OTHER INFORMATION: H, E, V, A, L, Y, W, K, I, Q, T, or R
<220> FEATURE:
<221> NAME/KEY: Xaa
<222> LOCATION: (11)..(11)
<223> OTHER INFORMATION: H, E, V, A, L, Y, W, K, I, Q, T, or R
<220> FEATURE:
<221> NAME/KEY: Xaa
<222> LOCATION: (14)..(14)
<223> OTHER INFORMATION: H, E, V, A, L, Y, W, K, I, Q, T, or R
<220> FEATURE:
<221> NAME/KEY: Xaa
<222> LOCATION: (15)..(15)
<223> OTHER INFORMATION: H, E, V, A, L, Y, W, K, I, Q, T, or R
<220> FEATURE:
<221> NAME/KEY: Xaa
<222> LOCATION: (18)..(18)
<223> OTHER INFORMATION: H, E, V, A, L, Y, W, K, I, Q, T, or R
<220> FEATURE:
<221> NAME/KEY: Xaa
<222> LOCATION: (42)..(42)
<223> OTHER INFORMATION: H, E, V, A, L, Y, W, K, I, Q, T, or R
<220> FEATURE:
<221> NAME/KEY: Xaa
<222> LOCATION: (46)..(46)
<223> OTHER INFORMATION: H, E, V, A, L, Y, W, K, I, Q, T, or R
<220> FEATURE:
<221> NAME/KEY: Xaa
<222> LOCATION: (49)..(49)
<223> OTHER INFORMATION: H, E, V, A, L, Y, W, K, I, Q, T, or R
<220> FEATURE:
<221> NAME/KEY: Xaa
<222> LOCATION: (50)..(50)
<223> OTHER INFORMATION: H, E, V, A, L, Y, W, K, I, Q, T, or R
<220> FEATURE:
<221> NAME/KEY: Xaa
<222> LOCATION: (53)..(53)
<223> OTHER INFORMATION: H, E, V, A, L, Y, W, K, I, Q, T, or R

<400> SEQUENCE: 34

Ile Ala Ala Lys Phe Asp Xaa Xaa Gln Ser Xaa Ala Asp Xaa Xaa Ile
1               5                   10                  15

Leu Xaa Leu Pro Asn Leu Thr Glu Glu Gln Arg Asn Ala Phe Arg Gln
```

-continued

```
        20                  25                  30

Ser Leu Ser Asp Asp Pro Ser Val Ser Xaa Glu Val Leu Xaa Glu Ala
    35                  40                  45

Xaa Xaa Leu Asn Xaa Ser Gln Ala Pro Lys
    50                  55
```

TRIPLE-HELICAL POLYPEPTIDES LACKING BINDING AFFINITY FOR THE Fc DOMAIN OF IMMUNOGLOBULIN AND USES THEREOF

TECHNICAL FIELD

The present invention relates to the field of protein engineering and purification and relates in particular to novel polypeptides having a triple-helical structure and lacking binding affinity for the Fc domain of immunoglobulin. The invention further relates to uses of the novel non-Fc binding polypeptides in technical applications such as affinity chromatography, as well as in therapy and diagnostics. In addition, the present invention relates to a method of reducing the binding affinity of a polypeptide having a triple-helical structure for the Fc domain of immunoglobulin.

BACKGROUND OF THE INVENTION

The downstream processing of recombinantly produced polypeptides generally involves the purification of the polypeptide expressed in a host cell. The purification process typically includes one or more chromatography steps, and affinity chromatography is often used as a capture step. While affinity chromatography is a simple and robust method that yields pure and concentrated product in a single step, there is an ongoing need for advanced tools that allow an efficient and targeted protein purification as well as the development of new molecules suitable for use in technical applications such as affinity chromatography, or in therapy and diagnostics.

The present invention meets this need by providing novel polypeptides having a triple-helical structure and lacking binding affinity for the Fc domain of immunoglobulin. These novel polypeptides are particularly advantageous because they allow a precise capturing in affinity chromatography by virtue of Fc-independent purification of proteins. Furthermore, the novel triple-helical polypeptides lacking binding affinity for the Fc domain of immunoglobulin enable the generation of libraries that allow the identification of highly selective target-specific molecules that are useful not only in technical applications, but also in therapy and diagnostics. The overview is exemplary only and thus does not necessarily describe all problems solved by the present invention.

SUMMARY OF THE INVENTION

The present disclosure provides the following items 1 to 15, without being specifically limited thereto:

1. A polypeptide having a triple-helical structure, wherein helix 1, 2, and 3 correspond with respect to their positions to positions 7-19, 23-37, and 40-56, respectively, of SEQ ID NO: 1, and wherein the polypeptide comprises:
   a) an acidic amino acid selected from aspartic acid (D) and glutamic acid (E) at the position corresponding to position 13 of SEQ ID NO: 1; and
   b) a basic amino acid selected from any one of arginine (R), lysine (K), and histidine (H) at the position corresponding to position 31 of SEQ ID NO: 1.
2. The polypeptide having a triple-helical structure according to item 1, wherein the polypeptide has no detectable binding affinity for the Fc domain of immunoglobulin as determined by Surface Plasmon Resonance (SPR).
3. The polypeptide having a triple-helical structure according to item 1 or 2, wherein the polypeptide comprises
   a) an aspartic acid (D) at the position corresponding to position 13 of SEQ ID NO: 1; and/or
   b) an arginine (R) at the position corresponding to position 31 of SEQ ID NO: 1.
4. The polypeptide having a triple-helical structure according to any one of items 1 to 3, further comprising a serine(S) at one or more of the positions corresponding to positions 10, 14, and 35 of SEQ ID NO: 1.
5. A fusion protein comprising the polypeptide according to any one of items 1-4.
6. A method of generating a polypeptide having a triple-helical structure according to any one of items 1~4 with binding affinity for a target protein, the method comprising the steps:
   a) providing one or more polypeptides according to any one of items 1-4;
   b) contacting the one or more polypeptides of a) with a target protein;
   c) identifying a complex comprising a polypeptide according to any one of items 1~4 bound to the target protein;
   d) obtaining a polypeptide according to any one of items 1~4 which is capable of binding to the target protein.
7. A composition comprising the polypeptide according to any one of items 1-4, or the fusion protein according to item 5, or the polypeptide with binding affinity for a target protein obtained by the method of item 6.
8. The polypeptide according to any one of items 1-4, or the fusion protein according to item 5, or the polypeptide with binding affinity for a target protein obtained by the method of item 6, for use in technical applications.
9. The polypeptide according to any one of items 1-4, or the fusion protein according to item 5, or the polypeptide with binding affinity for a target protein obtained by the method of item 6, for use in affinity chromatography.
10. The polypeptide according to any one of items 1-4, or the fusion protein according to item 5, or the polypeptide with binding affinity for a target protein obtained by the method of item 6, or the composition according to item 7, for use as a medicament, a diagnostic agent, and/or a prognostic agent.
11. A method of reducing the binding affinity of a polypeptide having a triple-helical structure for the Fc domain of immunoglobulin, the method comprising:
   a) selecting at least two amino acid positions within helix 1 and helix 2 for mutation, wherein helix 1 and 2 correspond with respect to their positions to positions 7-19 and 23-37, respectively, of SEQ ID NO: 1, and wherein the at least two amino acid positions for mutation correspond to positions 13 and 31 in the amino acid sequence of SEQ ID NO: 1; and
   b) mutating the at least two amino acid positions selected for mutation, wherein the mutating comprises the substitution of the amino acid at the position corresponding to position 13 of SEQ ID NO: 1 against an acidic amino acid selected from aspartic acid (D) and glutamic acid (E), and the substitution of the amino acid at the position corresponding to position 31 of SEQ ID NO: 1 against a basic amino acid selected from any one of arginine (R), lysine (K), and histidine (H).
12. The method of item 11, wherein the mutations comprise the substitution of the amino acid at the position corresponding to position 13 of SEQ ID NO: 1 against aspartic acid (D), and the substitution of the amino acid at the position corresponding to position 31 of SEQ ID NO: 1 against arginine (R).

13. The method of item 11 or 12, wherein the mutations further comprise the substitution of one or more of the amino acids at positions corresponding to positions 10, 14, and 35 in the amino acid sequence of SEQ ID NO: 1 against a serine(S).

14. A polypeptide having a triple-helical structure obtainable or obtained by, or prepared according to, the method of any one of items 6 and 11 to 13.

15. A polynucleotide encoding the polypeptide according to any one of items 1~4 and 14, or the fusion protein according to item 5.

This summary of the invention is not limiting, and other aspects and embodiments of the invention will become evident from the following description, examples and drawings.

BRIEF DESCRIPTION OF THE DRAWINGS

FIG. 1: shows the polypeptide of SEQ ID NO: 9 lacking binding affinity for the Immunoglobulin Fc-region, in particular the IgG1 Fc region. Analysis via label-free interaction assays using SPR spectroscopy (BIAcore). Solid line=Fc binding protein (SEQ ID NO: 17); dotted line=polypeptide of SEQ ID NO: 9. Change in refractive index measured in real time and plotted as response or resonance unit [RU] versus time [sec].

FIG. 2: shows the polypeptides of SEQ ID NOs: 1, 2, 3, 5, 7 (dotted lines) lacking binding affinity for the Immunoglobulin Fc-region, in particular the IgG1 Fc region, compared to Fc binding protein of SEQ ID NO: 16 (solid line). Analysis via label-free interaction assays using SPR spectroscopy (BIAcore). All concentrations=1 μM. Change in refractive index measured in real time and plotted as response or resonance unit [RU] versus time [sec].

FIG. 3: shows the polypeptides of SEQ ID NO: 1, 2, 3, 5, 7 (dotted lines) lacking binding affinity for the Immunoglobulin Fc-region, in particular the IgG1 Fc region, compared to Ig binding proteins SEQ ID NO: 16 or wildtype Protein A domain C or domain A or domain Z. Analysis via label-free interaction assays using SPR spectroscopy (BIAcore). All concentrations=10 μM. Change in refractive index measured in real time and plotted as response or resonance unit [RU] versus time [sec].

FIG. 4: shows the improved quantification of fusion proteins of SEQ ID NO: 1 (non-Fc-binding protein) fused to Protein A derivatives with specific target binding properties (BP) after affinity chromatography. The recovery of the binding proteins or fusion proteins was quantified by a sandwich immunoassay according to Manufacturer's instructions. BP1, binding protein 1 with Cys and His10; BP2 binding protein 2 with Cys and His10; BP3, binding protein 2 with Cys and His10; Fusion 1, fusion protein SEQ ID NO: 1-BP2-SEQ ID NO: 1; Fusion 2, fusion protein SEQ ID NO: 1-BP1; Fusion 3, fusion protein BP1-SEQ ID NO: 1, Fusion 4, fusion protein SEQ ID NO: 1-BP3; Fusion 5, fusion protein BP3-SEQ ID NO: 1. The recovery shows the relation of the measured signal to the internal standard.

DETAILED DESCRIPTION OF THE INVENTION

The present invention provides novel polypeptides with a triple-helical structure having no detectable binding affinity for the Fc domain of immunoglobulin as determined by, for example, Surface Plasmon Resonance (SPR). The polypeptides of the present invention represent advanced and powerful tools that fill a gap in the field of protein engineering and purification. In particular, the novel polypeptides provide for an advantageous effect in protein purification by virtue of the said altered binding affinity for Immunoglobulin Fc-regions. Specifically, as compared to known Ig-binding proteins, the novel polypeptides provided by the present invention allow that Fc-fusion proteins or antibodies themselves can be used as target proteins without interference from the Fc-domain. Thus, the novel polypeptides of the present invention are particularly advantageous because they allow a precise capturing in affinity chromatography due to an Fc-independent purification of target proteins. The lack of detectable binding affinity for the Fc domain of immunoglobulin (as determined by SPR) can be achieved when a polypeptide having a triple-helical structure comprises in helix 1 an acidic amino acid selected from aspartic acid (D) and glutamic acid (E) at the position corresponding to position 13 of SEQ ID NO: 1, and comprises in helix 2 a basic amino acid selected from any one of arginine (R), lysine (K), and histidine (H) at the position corresponding to position 31 of SEQ ID NO: 1, wherein helix 1, 2, and 3 correspond with respect to their positions to positions 7-19, 23-37, and 40-56, respectively, of SEQ ID NO: 1. The novel polypeptides of the present invention not only provide for particularly efficient and targeted protein purification, but also allow the identification of new valuable molecules based on a new concept for the design of libraries. In particular, the novel non-Fc binding polypeptides having a triple-helical structure enable the generation of libraries that allow the identification of highly selective target-specific molecules that are useful not only in technical applications but also in therapy and diagnostics. The non-Fc binding polypeptides of the present invention allow a novel library design, which is based on specific amino acid substitutions identified by the present inventors, and which clearly provides broadened experimental options and can increase the success rate of selection strategies designed to identify binding proteins. For example, a library scaffold that has no detectable Fc binding affinity as determined by suitable methods, for example SPR, enables the application of such a library against target proteins fused with Fc domains in selection and screening methods with less false positive hits directed against the Fc-part. In fact, this allows for the generation of a broader set of new target-specific binding molecules, each of which is further characterized by the altered target specificity, but still in particular having no detectable Fc binding affinity as determined by suitable methods, such as SPR.

Before the present invention is described in more detail below, it is to be understood that this invention is not limited to the particular methodology, protocols and reagents described herein as these may vary. It is also to be understood that the terminology used herein is for the purpose of describing particular aspects and embodiments only and is not intended to limit the scope of the present invention, which is reflected by the appended claims. Unless defined otherwise, all technical and scientific terms used herein have the same meaning as commonly understood by one of ordinary skill in the art to which this invention belongs. This includes a skilled person working in the field of protein engineering and purification, but also including a skilled person working in the field of developing new target-specific binding molecules for use in technical applications such as affinity chromatography, as well as in therapy and diagnostics.

Preferably, the terms used herein are defined as described in "A multilingual glossary of biotechnological terms: (IUPAC Recommendations)", Leuenberger, H. G. W, Nagel, B. and Kölbl, H. eds. (1995), Helvetica Chimica Acta, CH-4010 Basel, Switzerland).

Throughout this application and the claims, which follow, unless the context requires otherwise, the word "comprise", and variants such as "comprises" and "comprising", will be understood to imply the inclusion of a stated integer or step, or group of integers or steps, but not the exclusion of any other integer or step or group of integers or steps. The term "comprise(s)" or "comprising" may encompass a limitation to "consists of" or "consisting of", should such a limitation be necessary for any reason and to any extent.

Several documents (for example: patents, patent applications, scientific publications, manufacturer's specifications, instructions, GenBank Accession Number sequence submissions etc.) may be cited throughout the present application. Nothing herein is to be construed as an admission that the invention is not entitled to antedate such disclosure by virtue of prior invention. Some of the documents cited herein may be characterized as being "incorporated by reference". In the event of a conflict between the definitions or teachings of such incorporated references and definitions or teachings recited in the present specification, the text of the present application takes precedence.

All sequences referred to herein are disclosed in the attached sequence listing that, with its whole content and disclosure, forms part of the disclosure content of the present application.

General Definitions of Important Terms Used in the Application

The terms "protein" and "polypeptide" refer to any chain of two or more amino acids linked by peptide bonds and does not refer to a specific length of the product. Thus, "peptides", "protein", "amino acid chain", or any other term used to refer to a chain of two or more amino acids, are included within the definition of "polypeptide", and the term "polypeptide" may be used instead of, or interchangeably with, any of these terms. The term "polypeptide" is also intended to refer to the products of post-translational modifications of the polypeptide like, e.g., glycosylation, which are well known in the art.

The term "triple-helical structure" or "three-helix structure" refers to a polypeptide with three-helix bundles, wherein the polypeptide comprises at least 48 amino acids, preferably at least 50 amino acids, more preferably at least 58 amino acids, and even more preferably 58 amino acids, with helix 1 comprising amino acid residues 7-19, helix 2 comprising amino acid residues 23-37, and helix 3 comprising amino acid residues 40-56. Specifically, helix 1, 2, and 3 correspond, with respect to their positions, essentially to positions 7-19, 23-37, and 40-56, respectively, of SEQ ID NO: 1. In various embodiments, the polypeptide having a triple-helical structure is consisting of 56, 57 or 58 amino acids, preferably of 58 amino acids. Accordingly, a polypeptide provided by the present invention comprises three helices, wherein helix 1, helix 2, and helix 3 comprise the following amino acid positions relative to the amino acid positions in the sequence of SEQ ID NO: 1: Helix 1: amino acid positions corresponding essentially to positions 7-19 of the amino acid sequence of SEQ ID NO: 1; helix 2: amino acid positions corresponding essentially to positions 23-37 of the amino acid sequence of SEQ ID NO: 1; helix 3: amino acid positions corresponding essentially to positions 40-56 of the amino acid sequence of SEQ ID NO: 1. Further disclosed herein are embodiments of the polypeptide having a triple-helical structure provided by the present invention, wherein helix 1 with respect to its positions corresponds essentially to positions 6-19 of the amino acid sequence of SEQ ID NO: 1; helix 2 with respect to its positions corresponds essentially to positions 23-37 of the amino acid sequence of SEQ ID NO: 1; and helix 3 with respect to its positions corresponds essentially to positions 40-56 of the amino acid sequence of SEQ ID NO: 1.

As disclosed herein, a polypeptide having a triple-helical structure according to the present invention may be described as a folded polypeptide having a triple-helical structure. As further disclosed herein, a polypeptide having a triple-helical structure according to the present invention may be described as a polypeptide that folds into a three-helix bundle structure.

The terms "population" and "library" may be used interchangeably herein. A library may be a population of polypeptides or of polynucleotides. In other words, the library may take the form of a population or mixture or plurality of polypeptides or nucleic acid molecules (polynucleotides). A library may be a collection of variants.

The term "modification or "amino acid modification" refers to a substitution, a deletion, or an insertion of an amino acid at a particular position in a polypeptide sequence, with substitution meaning substitution by another amino acid. Given the known genetic code, and recombinant and synthetic DNA techniques, the one of ordinary skill in the art can readily construct DNAs encoding such amino acid variants.

The terms "variant" or "derivative" as used herein includes an amino acid sequence that differs from another amino acid sequence by at least one amino acid substitution, deletion, or insertion. The term "variant" according to the invention may refer for example to a polypeptide based on SEQ ID NO: 1 having a maximum of 20 amino acids substituted as compared to SEQ ID NO: 1. A variant according to the invention is characterized by a triple-helix motif as defined elsewhere herein. In some embodiments, a variant of the polypeptide of SEQ ID NO: 1 may encompass a deletion of up to 6 amino acid residues at the N-terminus, and/or a deletion of up to 4 amino acid residues at the C-terminus, relative to the amino acid sequence of SEQ ID NO: 1.

The terms "Fc region" and "Fc domain" may be used interchangeably herein. The Fc region is the tail region of an immunoglobulin, in particular of an antibody that interacts for example with cell surface receptors called Fc receptors. Thus, the Fc region or Fc domain means the Fc region or Fc domain of an immunoglobulin, in particular an antibody. In various embodiments, the Fc region is from a mammalian IgG (antibody), including human IgG, mouse IgG, rat IgG, goat IgG, bovine IgG, guinea pig IgG, and rabbit IgG. The Fc region may also be from human IgM or human IgA. In various embodiments, the Fc region is from a human IgG (antibody), such as from a human $IgG_1$ (antibody), human $IgG_2$ (antibody), or human $IgG_4$ (antibody), even more preferably from a human $IgG_1$ (antibody). In various embodiments, the Fc region means the human $IgG_1$ Fc region having the amino acid sequence of SEQ ID NO: 18 or of SEQ ID NO: 19, or a variant thereof having at least 95%, preferably at least 96%, at least 97%, at least 98%, or at least 99%, sequence identity to the amino acid sequence of SEQ ID NO: 18 or of SEQ ID NO: 19.

The term "target" or "target protein" as used herein refers to a protein or peptide or fragments thereof and the like having an antigen or epitope recognized by the specific binding proteins.

As described herein, "Fc binding" may be considered to mean interaction with the Fc-region of most IgGs with high selectivity and affinity. The binding site is in a conserved region known as consensus binding site which is located at the hinge region between the CH2 and CH3 domains of the Fc region.

As described herein, a "non-Fc binding polypeptide" refers to a polypeptide with no Fc binding, i.e. with no detectable interaction with the Fc-region of IgGs, as determined by suitable methods as described below, for example, by SPR analysis.

The terms "binding affinity" and "binding activity" may be used herein interchangeably, and they refer to the ability of a polypeptide of the invention to bind to another protein, peptide, or fragment or domain thereof. Binding affinity is typically measured and reported by the equilibrium dissociation constant ($K_D$), which is used to evaluate and rank order strengths of bimolecular interactions. The binding affinity and dissociation constants can be measured quantitatively.

Methods for determining binding affinities are well known to the skilled person and can be selected, for instance, from the following methods: surface plasmon resonance (SPR), enzyme-linked immunosorbent assay (ELISA), kinetic exclusion analysis (KinExA assay), Bio-layer interferometry (BLI), flow cytometry, fluorescence spectroscopy techniques, isothermal titration calorimetry (ITC), analytical ultracentrifugation, radioimmunoassay (RIA or IRMA), and enhanced chemiluminescence (ECL). Typically, a dissociation constant $K_D$ is determined at temperatures between the range of 20° C. and 30° C. If not specifically indicated otherwise, $K_D$ values recited herein are determined at 25° C. by SPR. A polypeptide that has no detectable binding affinity for the Fc domain of immunoglobulin as determined by SPR means a polypeptide that has no detectable binding affinity for the Fc domain of immunoglobulin as determined at 25° C. by SPR. The most widely used SPR-based system is the BIAcore, produced by BIAcore AB. In various embodiments of the present invention, the binding affinity for the Fc domain of immunoglobulin may be determined by the BIAcore SPR system. In various embodiments, the concentration of the analyte is 1 μM (see FIG. 1 and FIG. 2). In various other embodiments, the concentration of the analyte is 10 μM (see FIG. 3). Accordingly, in various embodiments of the present invention, the polypeptide of the invention that has no detectable binding affinity for the Fc domain of immunoglobulin as determined by SPR, wherein the concentration of the analyte in the SPR assay is 1 μM, preferably wherein the binding affinity is determined at 25° C. In various other embodiments of the present invention, the polypeptide of the invention that has no detectable binding affinity for the Fc domain of immunoglobulin as determined by SPR, wherein the concentration of the analyte in the SPR assay is 10 μM, preferably wherein the binding affinity is determined at 25° C. The binding affinity to the Ig Fc domain may be measured with reference to the polypeptide having the amino acid sequence of SEQ ID NO: 17 (see, for example, FIG. 1), or alternatively with reference to the polypeptide having the amino acid sequence of SEQ ID NO: 16 (see, for example, FIG. 2 or FIG. 3). The sequences of SEQ ID NO: 16 and SEQ ID NO: 17 differ at positions 1, 11, 35 and 42 as follows: SEQ ID NO: 16: 1I, 11A, 35R, 42L; and SEQ ID NO: 17: 1N, 11S, 35K, 42K. Alternatively, the Fc binding affinity can be determined with reference to any Protein A wildtype domain or derivatives thereof, for example, domain C (SEQ ID NO: 20) or domain A (SEQ ID NO: 21) or domain Z (SEQ ID NO: 22), see, for example, FIG. 3.

The term "fusion protein" relates to a protein comprising at least a first protein joined genetically to at least a second protein. A fusion protein is created through joining of two or more genes that originally coded for separate proteins. Thus, a fusion protein may comprise a multimer of identical or different proteins which are expressed as a single, linear polypeptide.

As used herein, the term "linker" refers in its broadest meaning to a molecule that covalently joins at least two other molecules.

The term "amino acid sequence identity" refers to a quantitative comparison of the identity (or differences) of the amino acid sequences of two or more proteins. "Percent (%) amino acid sequence identity" with respect to a reference polypeptide sequence is defined as the percentage of amino acid residues in a sequence that are identical with the amino acid residues in the reference polypeptide sequence, after aligning the sequences and introducing gaps, if necessary, to achieve the maximum percent sequence identity. To determine the sequence identity, the sequence of a query protein is aligned to the sequence of a reference protein or polypeptide, for example, to the polypeptide of SEQ ID NO: 1. Methods for sequence alignment are well known in the art. For example, for determining the extent of an amino acid sequence identity of an arbitrary polypeptide relative to the amino acid sequence of, for example, SEQ ID NO: 1, the SIM Local similarity program is preferably employed (Huang and Webb Miller (1991), Advances in Applied Mathematics, 12:337-357), that is freely available. For multiple alignment analysis, ClustalW can be used (Thompson et al. (1994) Nucleic Acids Res., 22:4673-4680).

DETAILED DESCRIPTION OF THE EMBODIMENTS OF THE INVENTION

The novel polypeptides of the present invention exhibit no detectable binding affinity for the Fc domain of immunoglobulin, for example, as determined by SPR. This lack of binding affinity for the immunoglobulin Fc domain can be achieved when a polypeptide having a triple-helical structure comprises in helix 1 an acidic amino acid selected from aspartic acid (D) and glutamic acid (E) at the position corresponding to position 13 of SEQ ID NO: 1, and comprises in helix 2 a basic amino acid selected from any one of arginine (R), lysine (K), and histidine (H) at the position corresponding to position 31 of SEQ ID NO: 1, wherein helix 1, 2, and 3 correspond with respect to their positions essentially to positions 7-19, 23-37, and 40-56, respectively, of SEQ ID NO: 1. The following Table 1 shows examples for triple-helix polypeptides that lack detectable Immunoglobulin Fc binding.

TABLE 1

Amino acid sequences of non-Fc-binding proteins (PAdelFc) SEQ ID NOs: 1, 2, 3, 4, 5, 6, 7, 8, 9, 10, 11, 12, 13, 14, 15, 23, 24, 25, 26, 27, 28, 29, 30. Positions 13 and 31 are shown in bold.

| SEQ ID | amino acid sequence of PAdelFc |
|---|---|
| 1 | IAAKFDEAQSAADSEILHLPNLTEEQRNAF**R**QSLSDDPSVSL EVLGEAQKLNDSQAPK |
| 2 | IAAKFDEAQQAADYEILHLPNLTEEQRNAF**R**QSLRDDPSVSL EVLGEAQKLNDSQAPK |
| 3 | IAAKFDEAQQAADYEILHLPNLTEEQRNAFRQSLSDDPSVSL EVLGEAQKLNDSQAPK |
| 4 | IAAKFDEAQSAADYEILHLPNLTEEQRNAF**R**QSLRDDPSVSL EVLGEAQKLNDSQAPK |
| 5 | IAAKFDEAQSAADYEILHLPNLTEEQRNAF**R**QSLSDDPSVSL EVLGEAQKLNDSQAPK |
| 6 | IAAKFDEAQQAADSEILHLPNLTEEQRNAF**R**QSLRDDPSVSL EVLGEAQKLNDSQAPK |
| 7 | IAAKFDEAQSAADSEILHLPNLTEEQRNAF**R**QSLRDDPSVSL EVLGEAQKLNDSQAPK |
| 8 | IAAKFDEAQQAADSEILHLPNLTEEQRNAF**R**QSLSDDPSVSL EVLGEAQKLNDSQAPK |
| 9 | NAAKFDEAQSSADSEILHLPNLTEEQRNAF**R**QSLSDDPSVSK EVLGEAQKLNOSQAPK |
| 10 | IAAKHDKDQQAADYEILHLPNLTEDQRNAF**R**QSLRDDPSVSL EILGEAKKLNDAQAPP |
| 11 | IAAKHDKDQSAADSEILHLPNLTEDQRNAF**R**QSLSDDPSVSL EILGEAKKLNDAQAPP |
| 12 | IDAKFDEAQQAADYEILHLPNLTEDQRNAF**R**QSLRDDPSVSL SLLAEAKKLNDAQAPP |
| 13 | IDAKFDEAQSAADSEILHLPNLTEDQRNAF**R**QSLSDDPSVSL SLLAEAKKLNDAQAPP |
| 14 | IDAQHDEDQQAADYEILHLPNLTEEQRNAF**R**QSLRDDPSQSL EILAEAKKLNESQAPK |
| 15 | IDAQHDEDQSAADSEILHLPNLTEEQRNAF**R**QSLSDDPSQSL EILAEAKKLNESQAPK |
| 23 | IAAQHDKEQQAADYEILHLPNLTEDQRNAF**R**QSLRDDPSVSL EILGEAKKLNDAQAPK |
| 24 | IAAQHDKEQSAADSEILHLPNLTEDQRNAF**R**QSLSDDPSVSL EILGEAKKLNDAQAPK |
| 25 | IAAQHDKDQQAADYEILHLPNLTEEQRNAF**R**QSLRDDPSVSL EILAEAKKLNDAQAPK |
| 26 | IAAQHDKDQSAADSEILHLPNLTEEQRNAF**R**QSLSDDPSVSL EILAEAKKLNDAQAPK |
| 27 | IDAKFDEAAQAADYEILHLPNLTEDQRNAF**R**QSLRDDPSVSL ALLAEAKKLNDAQAPP |
| 28 | IDAKFDEAASAADSEILHLPNLTEDQRNAF**R**QSLSDDPSVSL ALLAEAKKLNDAQAPP |
| 29 | IDAKFDEAQQAADYEILHLPNLTEDQRNAF**R**QSLRDDPSVSL ALLAEAKKLNDAQAPP |
| 30 | IDAKFDEAQSAADSEILHLPNLTEDQRNAF**R**QSLSDDPSVSL ALLAEAKKLNDAQAPP |

The following Table 2 summarizes specific amino acids in triple-helix polypeptides resulting in no Fc-binding. Positions 10, 13, 14, 31, and 35 correspond to the positions in SEQ ID NO: 1. D=Aspartic acid, R=Arginine, S=Serine.

TABLE 2

Amino acids in triple helix protein(s) that result in no detectable Fc-binding of the triple helix protein(s).

| Pos 10 | Pos 13 | Pos 14 | Pos 31 | Pos 35 | Examples shown as SEQ ID NOs: |
|---|---|---|---|---|---|
| | D | | R | | 2, 10, 12, 14, 23, 25, 27, 29 |
| | D | | R | S | 3 |
| S | D | | R | | 4 |
| S | D | | R | S | 5 |
| | D | S | R | | 6 |
| S | D | S | R | | 7 |
| | D | S | R | S | 8 |
| S | D | S | R | S | 1, 9, 11, 13, 15, 24, 26, 28, 30 |

Accordingly, the present invention provides a non-Fc binding polypeptide wherein the polypeptide comprises: an acidic amino acid selected from aspartic acid and glutamic acid at the position corresponding to position 13 of SEQ ID NO: 1; and a basic amino acid selected from any one of arginine, lysine, and histidine at the position corresponding to position 31 of SEQ ID NO: 1. Structural characterization by specific amino acids in positions 10, 14, 35. In various embodiments of the present invention, a non-Fc binding polypeptide as disclosed herein is structurally further characterized in that it comprises an amino acid residue having a polar side chain at one or more of the positions corresponding to positions 10, 14, and/or 35 of any one of SEQ ID NOs: 1-15, 23-30, in various embodiments SEQ ID NO: 1, preferably selected from serine(S), threonine (T), glutamine (Q), asparagine (N), histidine (H). In various embodiments, the polypeptide is structurally further characterized in that it comprises an amino acid residue having a polar side chain at the positions corresponding to positions 10 or 14 or 35, or positions 10 and 14, or positions 10 and 35, or positions 14 and 35, or positions 10, 14 and 35, of any one of SEQ ID NOs: 1-15, 23-30, in various embodiments SEQ ID NO: 1. Preferably, the non-Fc binding polypeptide as disclosed herein is structurally further characterized in that it comprises a serine at one or more of the positions corresponding to positions 10, 14, and 35 of any one of SEQ ID NOs: 1-15, 23-30, in various embodiments SEQ ID NO: 1. In some embodiments, the non-Fc binding polypeptide as disclosed herein is structurally further characterized in that it comprises a serine at all of the positions corresponding to positions 10, 14, and 35 of any one of SEQ ID NOs: 1-15, 23-30, in various embodiments SEQ ID NO: 1, in addition to an acidic amino acid in position corresponding to position 13 of any one of SEQ ID NOs: 1-15, 23-30, in various embodiments SEQ ID NO: 1, and a basic amino acid in in position corresponding to position 31 of any one of SEQ ID NOs: 1-15, 23-30, in various embodiments SEQ ID NO: 1.

Variants. Also disclosed herein is a polypeptide having at least 70% sequence identity to the amino sequence of any one of SEQ ID NOs: 1, 2, 3, 4, 5, 6, 7, 8, 9, 10, 11, 12, 13, 14, 15, 23, 24, 25, 26, 27, 28, 29, 30, in various embodiments SEQ ID NO: 1, wherein the polypeptide comprises an acidic amino acid selected from aspartic acid and glutamic acid at the position corresponding to position 13 of any one of SEQ ID NOs: 1-15, 23-30, in various embodiments SEQ ID NO: 1; and a basic amino acid selected from any one of arginine, lysine, and histidine at the position corresponding to position 31 of any one of SEQ ID NOs: 1-15, 23-30, in various embodiments SEQ ID NO: 1, and provided that the polypeptide has no detectable binding activity for IgG Fc, as for example determined by SPR.

In various preferred embodiments, any non-Fc binding polypeptide of the invention defined by having at least 70% sequence identity to the amino sequence of any one of SEQ ID NOs: 1, 2, 3, 4, 5, 6, 7, 8, 9, 10, 11, 12, 13, 14, 15, 23, 24, 25, 26, 27, 28, 29, 30, in various embodiments SEQ ID NO: 1, may have at least 71%, 72%, 73%, 74%, 75%, 76%, 77%, 78%, or 79% sequence identity to the amino sequence of any one of SEQ ID NOs: 1-15, and 23-30, in various embodiments SEQ ID NO: 1. In further embodiments, the non-Fc binding polypeptide has at least 80% sequence identity to the amino sequence of any one of SEQ ID NOs: 1-15, and 23-30, in various embodiments SEQ ID NO: 1. In some embodiments, the non-Fc binding polypeptide has at least 81%, 82%, 83%, 84%, 85%, 86%, 87%, or 88% sequence identity to the amino sequence of any one of SEQ ID NOs: 1-15, and 23-30, in various embodiments SEQ ID NO: 1. In preferred embodiments, the non-Fc binding polypeptide has at least 89% sequence identity to the amino sequence of any one of SEQ ID NOs: 1-15, and 23-30, in various embodiments SEQ ID NO: 1. In other embodiments, the non-Fc binding polypeptide has at least 90% or 95% sequence identity to the amino sequence of any one of SEQ ID NOs: 1-15, and 23-30, in various embodiments SEQ ID NO: 1.

All variants of the non-Fc binding polypeptides of SEQ ID NOs: 1-15, and 23-30 have a triple-helical structure as defined elsewhere herein, have a acidic amino acid in position 13 and a basic amino acid in position 31, and have no detectable binding affinity for the Fc domain of immunoglobulin, preferably has no detectable binding affinity for the Fc domain of immunoglobulin as determined, for example, by Surface Plasmon Resonance.

Multimers. In one embodiment of the invention, the non-Fc binding protein comprises 1, 2, 3, 4, preferably 1 or 2 non-Fc binding proteins linked to each other, i.e. the non-Fc binding protein can be, for example, a monomer, a dimer, a trimer, or a tetramer. Multimers of the invention are fusion proteins generated artificially, generally by recombinant DNA technology well-known to a skilled person. Non-fc binding proteins as disclosed herein may be prepared by any of the many conventional and well-known techniques such as plain organic synthetic strategies, solid phase-assisted synthesis techniques or by commercially available automated synthesizers. In some embodiments, the multimer is a homo-multimer, e.g. the amino acid sequences of non-Fc binding proteins are identical. In other embodiments, the multimer is a hetero-multimer, e.g. the amino acid sequences of non-Fc binding proteins are different.

Fusion proteins. According to one embodiment, provided herein is a fusion protein comprising a non-Fc-binding polypeptide as disclosed throughout the present application. According to one embodiment, provided herein is a fusion protein comprising one or more, for example two, non-Fc-binding polypeptide(s) as disclosed throughout the present application. More specifically, the fusion protein comprises one or more non-Fc-binding polypeptide(s) as disclosed throughout the present application, and a further polypeptide distinct from the polypeptide as disclosed. In various embodiments, the further polypeptide distinct from the non-Fc binding polypeptide as disclosed herein is a target binding protein, preferably an Immunoglobulin-binding polypeptide or a ubiquitin mutein with binding affinity for a predefined target. A target binding protein is a polypeptide with ability to bind a predefined target, preferably a protein target. Accordingly, some embodiments encompass fusion proteins comprising one or two non-Fc binding polypeptide(s) as disclosed herein and an Immunoglobulin-binding polypeptide. Accordingly, other embodiments encompass fusion proteins comprising one or two non-Fc binding polypeptide(s) as disclosed herein and a binding polypeptide with affinity for a predefined target. Accordingly, other embodiments encompass fusion proteins comprising one or two non-Fc binding polypeptide(s) as disclosed herein and a derivative of the human serum protein ubiquitin, e.g. a ubiquitin-based binding protein (ubiquitin mutein), including the well-known AFFILIN® molecules. Such fusion proteins are also particularly suitable for use in affinity chromatography for purifying pre-defined target proteins.

In some embodiments, a fusion protein may for example comprise the following combinations (from N-terminus to C-terminus):

(a) Non-Fc binding protein-target binding protein;
(b) target binding protein-Non-Fc binding protein;
(c) Non-Fc binding protein-target binding protein-Non-Fc binding protein;
(d) Non-Fc binding protein-Non-Fc binding protein-target binding protein;
(e) target binding protein-Non-Fc binding protein-Non-Fc binding protein, and/or
(f) target binding protein-Non-Fc binding protein-Non-Fc binding protein-target binding protein.

In some embodiments, a fusion protein may comprise a non-Fc binding protein selected from the group of SEQ ID Nos: 1-15, 23-30, or a non-Fc binding protein with at least 90% identity thereto. In some preferred embodiments, a fusion protein may comprise a non-Fc binding protein selected from SEQ ID NO: 1 or SEQ ID NO: 2. In some preferred embodiments, a fusion protein may comprise a non-Fc binding protein selected from SEQ ID NO: 27 or SEQ ID NO: 28, or a non-Fc binding protein with at least 90% identity thereto.

Such fusion proteins are particularly suitable for use in Protein A leaching assays for detecting Protein A or Protein A derivatives or other Immunoglobulin binding proteins leached during or after affinity chromatography. Protein A or Protein A derivatives or other Immunoglobulin binding proteins are quantified by a sandwich immunoassay as described in the Examples. Preferably, fusion proteins used in leaching assays comprise of one or two non-Fc-binding polypeptide(s) as described herein and an Ig binding protein (preferably Protein A or derived from Protein A or artificial Ig binding proteins). The moiety of such fusion proteins comprising a non-Fc-binding polypeptide does not interfere with the function of Ig binding protein. An example for improved detectability of a Protein A derivative if fused to at least one non-Fc-binding protein is shown see FIG. 4.

The fusion proteins might be suitable for stabilizing Protein A-based Ig binding proteins. For example, the expression of proteins is improved if expressed as fusion proteins comprising a non-Fc-binding polypeptide at the N- or C-terminus.

Furthermore, fusion proteins comprising at least one non-Fc binding polypeptide as disclosed herein and an Ig binding polypeptide are particularly suitable for use in affinity chromatography, because the distance to the matrix is favorably influenced.

The moieties of the fusion protein may be linked to each other directly head-to-tail, or may be linked by a linker, wherein the linker preferably is a peptide linker. In various embodiments, a peptide linker may be considered as an amino acid sequence which sterically separates the two portions of the fusion protein. Typically, such linker consists of between 1 and 10 amino acids.

A fusion protein may be characterized as a protein formed by genetically fusing or combining a gene encoding a non-Fc-binding polypeptide with a gene encoding a polypeptide distinct from the polypeptide as described herein. Accordingly, the fusion protein may be considered as the product of two or more genes that were translated together (no stop-codon in between).

Libraries. Some embodiments provide a population of novel polypeptides, which are derived from or based on or as defined by scaffold sequences of any one of monomeric non Fc-binding proteins as disclosed in SEQ ID NOs: 1-15, 23-30, which form the basis for specific preferred libraries. The advantage of libraries based on such small, monomeric scaffold sequences as disclosed in this invention is the high structural stability so that proteins identified from such libraries may withstand harsh conditions. Further, the non-Fc binding property of such proteins will be of advantage for several applications.

Some embodiments provide a population of polypeptides lacking detectable binding affinity for the Fc domain of immunoglobulin that are characterized by having a triple-helix structure.

Preferably, the population of polypeptides lacking detectable binding affinity for the Fc domain of immunoglobulin has between 70% to 90%, preferably between 70% to 85%, sequence identity to the amino sequence of SEQ ID NO: 1-15, 23-30, for example to SEQ ID NO: 1 or SEQ ID NO: 27. Some embodiments provide libraries comprising a plurality of variants based on the scaffold of, for example, SEQ ID NO: 1 or SEQ ID NO: 27. The libraries provided herein may comprise, for example, a sequence diversity of polypeptides, each optionally comprising a different amino acid sequence. Sequence differences between library members are responsible for the diversity present in the library. A randomly modified nucleotide or amino acid sequence is a nucleotide or amino acid sequence which in a number of positions has been subjected to substitution, insertion, or deletion by nucleotides or amino acids.

Such libraries comprise variant polypeptides of, for example, SEQ ID NO: 1 or SEQ ID NO: 27 that have at least an acidic amino acid at the position corresponding to position 13 of SEQ ID NO: 1; and a basic amino acid at the position corresponding to position 31 of any one of SEQ ID NOs: 1-15, 23-30, in various embodiments SEQ ID NO: 1, and may be further characterized by the specific amino acid residues at the positions corresponding to positions 10, 14, and 35 of any one of SEQ ID NOS: 1-15, 23-30, in various embodiments SEQ ID NO: 1, as described elsewhere herein. Further, in some embodiments the libraries comprise variant non-Fc binding polypeptides of any one of SEQ ID NOs: 1-15, 23-30, in various embodiments SEQ ID NO: 1, having at least five amino acid substitutions in each of two of three helices, i.e. at least 10 amino acids of for example SEQ ID NO: 1 or SEQ ID NO: 27 randomized in order to generate a novel interaction site for pre-selected non-Fc targets. Libraries as disclosed herein comprise variant polypeptides of any one of SEQ ID NOs: 1-15, 23-30, in various embodiments SEQ ID NO: 1, with randomized amino acid positions, preferably in helix 3 and helix 1, or in helix 3 and helix 2.

Thus, some embodiments of the invention relate to a library based on a non-Fc-binding protein such as any one of SEQ ID NOs: 1-15, 23-30, in various embodiments SEQ ID NO: 1, or a corresponding triple helix protein, wherein the compounds of the library comprise one of following non-Fc binding protein(s) having 10-16 randomized positions in two of the three helices: a) comprising at least 5 or more mutations at positions selected from positions 25, 26, 28, 29, 30, 32, 33, 35, 36, 37 in helix 2, and at least 5 or more mutations at positions selected from positions 42, 43, 44, 46, 47, 50, 54 in helix 3; as shown in SEQ ID NO: 31 and SEQ ID NO: 32, b) comprising at least 5 or more mutations at positions selected from positions 7, 8, 10, 11, 14, 15, 18, 20 in helix 1, and 5 or more mutations at positions selected from positions 42, 43, 46, 47, 49, 50, 53, 54 in helix 3; as shown in SEQ ID NO: 33 and SEQ ID NO: 34. The identification of the said positions in helix 1, helix 2, and helix 3 is understood in relation to the corresponding positions in any one of SEQ ID NO: 1-15, 23-30, in various embodiments SEQ ID NO: 1. In some embodiments, substitutions may be by any amino acid except C, G, N, or P. This is because cysteine is a reactive amino acid and can form disulfide bonds with other cysteine-containing polypeptides; glycine and praline are known to destabilize helical structures; finally, asparagine is particularly sensitive against caustic treatment, which leads to degradation.

In some embodiments, the non-Fc binding polypeptide having a triple-helical structure comprises, or consists of, the amino acid sequence of any one of SEQ ID NOs: 31, 32, 33, or 34.

Method of producing libraries. In addition to the libraries described elsewhere herein, the present invention provides a method of producing such libraries. As a state-of-the-art method for library synthesis, the favorable triplet technology (Morphosys Slonomics) is capable of synthesizing random libraries with a distribution of, e.g., 20 natural amino acids or a selection of amino acids. Assuming a random distribution of the 20 natural amino acids at, e.g., 7 to 16 positions generates a pool of 20 to the power of 7 (207) to 16 (2016) theoretical unique variants of the polypeptide of SEQ ID NO: 1 or of SEQ ID NOs: 2-15, 23-30. This pool of genes/proteins constitutes a library of the different variants of non-Fc binding protein of SEQ ID NO: 1 or of SEQ ID NOs: 2-15, 23-30.

Library display. The library may be displayed as a conjugate to RNA, on the surfaces of ribosomes, bacteriophage, viruses, bacteria, or yeast cells, preferably displayed on ribosomes and bacteriophage, and subjected to repeated rounds of panning against the respective target. Contacting according to the invention is preferably performed by means of a suitable presentation and selection method such as the phage display, ribosomal display, mRNA display or cell surface display, yeast surface display or bacterial surface display methods, preferably by means of the phage display method or the ribosomal display method. The methods mentioned herein are known to those skilled in the art.

In the phage display procedure described herein, recombinant variants of SEQ ID NO: 1 or of corresponding non-Fc binding scaffold amino acid sequences, are presented on a filamentous phage while the coding DNA of the presented variation is present at the same time packed in a single-stranded form in the phage envelope. Thus, in the frame of an affinity enrichment variations having certain properties can be selected from a library and their genetic information can be amplified by infection of suitable bacteria or added to another cycle of enrichment, respectively. Presentation of variants of SEQ ID NO: 1 or of corresponding non-Fc binding scaffold amino acid sequences, on the phage surface is achieved by genetic fusion to a signal sequence and a capsid or surface protein of the phage. Furthermore, the encoded protein can contain further functional elements such as an affinity tag or an antibody epitope for detection and/or purification by affinity chromatography or a protease recognition sequence for specific cleavage of the protein in the course of the affinity enrichment.

Method of selecting from a library. In another aspect, the present invention relates to a method for selecting from a library comprising variants of the scaffold of SEQ ID NO: 1 or of corresponding non-Fc binding scaffold amino acid sequences, one or more of said variants having a specific binding affinity to a target protein or target peptide, said method comprising the steps of a) providing a library comprising variants of the scaffold of SEQ ID NO: 1 or of corresponding non-Fc binding scaffold amino acid sequences; (b) contacting the library with the target protein or target peptide under conditions and for a time sufficient to permit one or more variant polypeptides of SEQ ID NO: 1 or of corresponding non-Fc binding scaffold amino acid sequences and the target protein or peptide to interact; and (c) selecting (identifying) from the library one or more variant polypeptides of SEQ ID NO: 1 or of corresponding non-Fc binding scaffold amino acid sequences having a specific binding affinity ($K_D$) to the target protein in a range of $10^{-5}$ to $10^{-12}$ M. Selection procedure of variants. The bacterial vector suitable for the selection procedure in the context of the isolation of variants of SEQ ID NO: 1 or of corresponding non-Fc binding scaffold amino acid sequences and into which the gene cassette for the fusion protein described is inserted is referred to as phagemid. Among others, it contains the intergenic region of a filamentous phage (e.g., M13 or f1) or a portion thereof which in the case of a superinfection of the bacterial cell carrying the phagemid by means of helper phages results in the packaging of a covalently closed strand of phagemid DNA into a phage capsid.

Phage particles obtained can be selected with respect to the binding of the variants of SEQ ID NO: 1 or of corresponding non-Fc binding scaffold amino acid sequences disclosed herein presented thereon to any target by means of methods known to those skilled in the art. For this purpose, the presented variants of SEQ ID NO: 1 or of corresponding non-Fc binding scaffold amino acid sequences can be transiently immobilized to target substance and can be specifically eluted after non-binding variations have been separated. The phage particles obtained in this manner can be re-amplified and enriched by successive cycles of selection and amplification of variants of SEQ ID NO: 1 or of corresponding non-Fc binding scaffold amino acid sequences with binding properties to selected targets.

Variants of SEQ ID NO: 1 or of corresponding non-Fc binding scaffold amino acid sequences from enriched phage pools are cloned into expression vectors for individual protein expression. Preferably, expression of the variants of SEQ ID NO: 1 or of corresponding non-Fc binding scaffold amino acid sequences as disclosed herein enables screening for specific binding proteins by established techniques, such as ELISA on automated high-throughput screening platforms. Identified clones with desired binding properties can then be sequenced to reveal the amino acid sequences. The identified protein may be subjected to further maturation steps, e.g., by generating additional libraries based on alterations of the identified sequences and repeated phage display, ribosomal display, panning and screening steps as described herein. The expressed proteins can be contacted with a target protein to enable binding of the partners to each other. This process enables identification of those proteins which have a binding activity to the given target protein.

The present invention permits the person skilled in the art to enrich a chosen repertoire of variants of SEQ ID NO: 1 or of corresponding non-Fc binding scaffold amino acid sequences, which are functional and capable of binding to a given target, except for having no detectable binding affinity for the Fc domain of immunoglobulin as determined by suitable methods such as SPR.

Method of generation of a polypeptide. The present invention further provides a method for the generation of a novel non-Fc binding polypeptide as disclosed herein with binding affinity for a pre-defined target protein, the method comprising the following steps: (i) providing a population of polypeptides as disclosed herein; (ii) contacting the population of polypeptides of (i), with a target protein; (iii) identifying a complex comprising a non-Fc binding polypeptide as disclosed herein bound to the target protein; and (iv) obtaining a non-Fc binding polypeptide disclosed herein which is capable of binding to the target protein. Unspecific binding polypeptides may be eliminated by several washing steps. Proteins having specific binding affinity to the target protein remain with the target protein. After elution from target protein, polypeptides can be amplified and subjected to one or more rounds of contacting with the target protein. The present disclosure encompasses such non-Fc binding polypeptides with binding affinity for a target molecule obtained or obtainable by, or generated or prepared by, the aforementioned method.

The method for the generation of a novel non-Fc binding polypeptide with binding affinity for a target molecule may comprise, after step (iii) and prior to step (iv), a further step of determining the binding affinity of the polypeptide to the target protein. The binding affinity may be determined as described elsewhere herein.

Some embodiments refer to a method for the generation of a variant protein derived from the polypeptide of any one of non-Fc binding proteins of SEQ ID NOs: 1-15, 23-30, in various embodiments SEQ ID NO: 1, said method comprising the steps of (i) subjecting nucleotide triplets of a nucleic acid molecule encoding the amino acid sequence of the polypeptide of any one of SEQ ID NOs: 1-15, 23-30 modified in at least 5 selected positions in each helix 3 and helix 2, or in at least 5 selected positions in each helix 3 and helix 1 to mutagenesis, (ii) obtaining one or more variant nucleic acid molecule(s), (iii) expressing the one or more variant nucleic acid molecule(s) obtained in (ii) in a suitable expression system, and (iv) enriching the one or more variant proteins by means of selection and/or isolation.

The mutagenesis takes into account any of the structural technical features according to the aspects and embodiments described elsewhere herein.

Use of the novel polypeptides in technical applications. Also provided herein is the use of any novel polypeptide of the present invention, including novel polypeptides having binding affinity for a target protein obtained by the herein-described method, in technical applications, preferably for use in affinity chromatography.

As described herein, affinity chromatography (also called affinity purification) makes use of specific binding interactions between molecules. For example, fusion proteins comprising any one of non-Fc binding proteins of SEQ ID NOs: 1, 2, 3, 4, 5, 6, 7, 8, 9, 10, 11, 12, 13, 14, 15, 23, 24, 25, 26, 27, 28, 29, 30 and at least 90% identical proteins thereto can be used in leaching assays, as described herein. Further, any one of non-Fc binding proteins of SEQ ID NOs: 1-15, 23-30 and at least 90% identical proteins may be immobilized as spacer for binding proteins to a solid support, as described herein. Methods for immobilization of protein and methods for affinity chromatography are well-known in the field of protein engineering and purification and can easily performed by a skilled person in this field using standard techniques and equipment.

In various embodiments, the method of affinity purification may further comprise one or more washing steps carried out under conditions sufficient to remove from the affinity separation matrix some or all molecules that are non-specifically bound thereto. Affinity separation matrixes suitable for the disclosed uses and methods are those matrixes according to the aspects and embodiments described herein, and as known to a person skilled in the art.

Conjugation to a solid support. In various aspects and/or embodiments of the present invention, the novel polypeptides disclosed herein including novel polypeptides generated or obtained by any of the methods as described herein are conjugated to a solid support. In some embodiments of the invention, the polypeptide comprises an attachment site for site-specific covalent coupling of the polypeptide to a solid support. Specific attachment sites comprise without being limited thereto, natural amino acids, such as cysteine or lysine, which enable specific chemical reactions with a reactive group of the solid phase, or a linker between the solid phase and the protein.

In some embodiments, the non-Fc binding proteins may also comprise additional amino acid residues at the N- and/or C-terminal end, such as for example an additional sequence with or without a tag at the N- and/or C-terminal end.

Affinity separation matrix. In another embodiment, an affinity separation matrix is provided comprising a non-Fc binding polypeptide, including a polypeptide identified by any of the methods as described herein. In various embodiments, the affinity separation matrix may be an affinity purification matrix.

In preferred embodiments, the affinity separation matrix is a solid support. The affinity separation matrix comprises at least one non-Fc binding polypeptide provided by the present invention. Accordingly, any of the novel non-Fc binding proteins of polypeptides disclosed herein is encompassed for use in the separation and/or purification of a protein by an affinity (separation/purification) matrix.

Solid support matrices for affinity chromatography are known in the art and include, e.g., without being limited thereto, agarose and stabilized derivatives of agarose, cellulose or derivatives of cellulose, controlled pore glass, monolith, silica, zirconium oxide, titanium oxide, or synthetic polymers, and hydrogels of various compositions.

The formats for solid support matrices can be of any suitable well-known kind. Such solid support matrix for coupling a novel protein or polypeptide of the present invention might comprise, e.g., one of the following, without being limited thereto: columns, capillaries, particles, membranes, filters, monoliths, fibers, pads, gels, slides, plates, cassettes, or any other format commonly used in chromatography and known to someone skilled in the art.

In one embodiment, the matrix is comprised of substantially spherical particles, also known as beads, for example Sepharose or Agarose beads. Matrices in particle form can be used as a packed bed or in a suspended form including expanded beds. In other embodiments of the invention, the solid support matrix is a membrane, for example a hydrogel membrane. In some embodiments, the affinity purification may involve a membrane as a matrix to which a protein of the present invention is covalently bound. The solid support can also be in the form of a membrane in a cartridge.

In some embodiments, the affinity purification involves a chromatography column containing a solid support matrix to which a novel protein of the present invention is covalently bound. A novel protein or polypeptide of the present invention may be attached to a suitable solid support matrix via conventional coupling techniques. Methods for immobilization of protein ligands to solid supports are well-known in the field of protein engineering and purification and can easily performed by a skilled person in this field using standard techniques and equipment.

Compositions. Furthermore, provided herein is a composition comprising a non-Fc binding polypeptide as disclosed throughout the present application, including novel non-Fc binding polypeptides with binding affinity for a target protein obtained by the corresponding method described herein. In various embodiments, such compositions comprise a diagnostically or therapeutically effective dose or amount of a novel non-Fc binding polypeptide. The amount of protein to be administered may depend, inter alia, on the organism to be treated, the type of disease, the age and weight of the patient, and other factors.

In various embodiments, the composition is a diagnostic composition comprising a non-Fc binding polypeptide and a diagnostically acceptable carrier. In various other embodiments, the composition is a pharmaceutical composition comprising a non-Fc binding polypeptide and a pharmaceutically acceptable carrier. The compositions optionally contain further auxiliary agents and excipients known to the one of ordinary skill in the art. These include, for example, without being limited thereto, stabilizing agents, surface-active agents, salts, buffers, coloring agents etc. Compositions comprising at least one non-Fc binding polypeptide can be prepared by methods known in the art. For example, the type of pharmaceutical preparation may depend on the particular type of disease to be treated, the route of administration, the severity of the disease, the patient to be treated and other factors known to those skilled in the art of medicine. Still further provided herein is the use of any novel non-Fc binding polypeptide, including novel polypeptides having binding affinity for a target protein obtained by the corresponding method described herein, or the use of the herein-described composition, as a medicament, a diagnostic agent, and/or a prognostic agent.

Method of reducing binding affinity of a polypeptide having a triple-helical structure for the Fc domain of immunoglobulin. The present invention also provides a method of reducing or attenuating the binding affinity of a polypeptide having a triple-helical structure for the Fc domain of immunoglobulin, the method comprising: (a) selecting at least two amino acid positions within helix 1 and helix 2 for mutation, wherein helix 1 and 2 correspond with respect to their positions to positions 7-19 and 23-37, respectively, of SEQ ID NO: 1, and wherein the at least two amino acid positions for mutation correspond to positions 13 and 31 in the amino acid sequence of SEQ ID NO: 1; and (b) mutating the at least two amino acid positions selected for mutation, wherein the mutating comprises the substitution of the amino acid at the position corresponding to position 13 of SEQ ID NO: 1 against an acidic amino acid selected from aspartic acid and glutamic acid, and the substitution of the amino acid at the position corresponding to position 31 of SEQ ID NO: 1 against a basic amino acid selected from any one of arginine, lysine, and histidine. Preferably, the mutations comprise the substitution of the amino acid at the position corresponding to position 13 of SEQ ID NO: 1 against aspartic acid, and the substitution of the amino acid at the position corresponding to position 31 of SEQ ID NO: 1 against arginine.

In still other preferred embodiments of the herein-described method, the mutations may further comprise the substitution of one or more of the amino acids at positions corresponding to positions 10, 14, and 35 in the amino acid sequence of any one of SEQ ID NOs: 1-15, 23-30, in various embodiments SEQ ID NO: 1, against any amino acid residue, preferably having a polar side chain, more preferably selected from serine, threonine, glutamine, asparagine, histidine, even more preferably a serine. The present invention encompasses a polypeptide having a triple-helical structure prepared according to the herein-described method of reducing or attenuating the binding affinity of a polypeptide having a triple-helical structure for the Fc domain of immunoglobulin.

The mutations may comprise the substitution of the amino acids at positions corresponding to positions 10 and 14, or positions 10 and 35, or positions 14 and 35, or positions 10, 14 and 35, in the amino acid sequence of any one of SEQ ID NOs: 1-15, 23-30, in various embodiments SEQ ID NO: 1, against an amino acid residue, preferably against an amino acid residue having a polar side chain.

Preferably, the mutations comprise the substitution of one or more of the amino acids at positions corresponding to positions 10, 14, and 35 in the amino acid sequence of any one of SEQ ID NOs: 1-15, 23-30, in various embodiments SEQ ID NO: 1 against serine, more preferably the substitution of two of the amino acids at positions corresponding to positions 10, 14, and 35 in the amino acid sequence of any one of SEQ ID NOs: 1-15, 23-30, in various embodiments SEQ ID NO: 1, including the positions corresponding to positions 10 and 14, 10 and 35, and 14 and 35, respectively, of any one of SEQ ID NOs: 1-15, 23-30, in various embodiments SEQ ID NO: 1. In particularly preferred embodiments, the mutations comprise the substitution of all of the amino acids at positions corresponding to positions 10, 14, and 35 in the amino acid sequence of any one of SEQ ID NOs: 1-15, 23-30, in various embodiments SEQ ID NO: 1 against serine.

In other preferred embodiments, the mutations comprise the substitution of one or more of the amino acids at positions corresponding to positions 10, 14, and 35 in the amino acid sequence of any one of SEQ ID NOs: 1-15, 23-30, in various embodiments SEQ ID NO: 1, against threonine, more preferably at two of the positions corresponding to positions 10, 14, and 35 of any one of SEQ ID NOs: 1-15, 23-30, in various embodiments SEQ ID NO: 1, including the positions corresponding to positions 10 and 14, 10 and 35, and 14 and 35, respectively, of any one of SEQ ID NOs: 1-15, 23-30, in various embodiments SEQ ID NO: 1.

In particularly preferred embodiments, the mutations comprise the substitution of all of the amino acids at positions corresponding to positions 10, 14, and 35 in the amino acid sequence of any one of SEQ ID NOs: 1-15, 23-30, in various embodiments SEQ ID NO: 1 against threonine. As described herein, a serine residue is preferred over a threonine residue at any one of the positions corresponding to positions 10, 14, and 35 of any one of SEQ ID NOs: 1-15, 23-30, in various embodiments SEQ ID NO: 1.

In various embodiments of the herein-described method, the mutations may comprise the substitution of the amino acid at the position corresponding to position 13 of any one of SEQ ID NOs: 1-15, 23-30, in various embodiments SEQ ID NO: 1 against aspartic acid, and the substitution of the amino acid at the position corresponding to position 31 of any one of SEQ ID NOs: 1-15, 23-30, in various embodiments SEQ ID NO: 1 against a basic amino acid selected from any one of arginine, lysine, and histidine at the position corresponding to position 31 of any one of SEQ ID NOs: 1-15, 23-30, in various embodiments SEQ ID NO: 1. The mutations may also comprise the substitution of the amino acid at the position corresponding to position 13 of SEQ ID NO: 1 against glutamic acid, and the substitution of the amino acid at the position corresponding to position 31 of any one of SEQ ID NOs: 1-15, 23-30, in various embodiments SEQ ID NO: 1 against a basic amino acid selected from any one of arginine, lysine, and histidine at the position corresponding to position 31 of any one of SEQ ID NOs: 1-15, 23-30, in various embodiments SEQ ID NO: 1.

In other preferred embodiments of the herein-described method, the mutations may comprise the substitution of the amino acid at the position corresponding to position 13 of any one of SEQ ID NOs: 1-15, 23-30, in various embodiments SEQ ID NO: 1 against aspartic acid or glutamic acid, and the substitution of the amino acid at the position corresponding to position 31 of any one of SEQ ID NOs: 1-15, 23-30, in various embodiments SEQ ID NO: 1 against arginine. In other preferred embodiments of the herein-described method, the mutations may comprise the substitution of the amino acid at the position corresponding to position 13 of any one of SEQ ID NOs: 1-15, 23-30, in various embodiments SEQ ID NO: 1 against aspartic acid or glutamic acid, and the substitution of the amino acid at the position corresponding to position 31 of any one of SEQ ID NOs: 1-15, 23-30, in various embodiments SEQ ID NO: 1 against lysine. In other preferred embodiments of the herein-described method, the mutations may comprise the substitution of the amino acid at the position corresponding to position 13 of any one of SEQ ID NOs: 1-15, 23-30, in various embodiments SEQ ID NO: 1 against aspartic acid or glutamic acid, and the substitution of the amino acid at the position corresponding to position 31 of any one of SEQ ID NOs: 1-15, 23-30, in various embodiments SEQ ID NO: 1 against histidine.

In further preferred embodiments of the herein-described method, the mutations may comprise the substitution of the amino acid at the position corresponding to position 13 of any one of SEQ ID NOs: 1-15, 23-30, in various embodiments SEQ ID NO: 1 against aspartic acid, and the substitution of the amino acid at the position corresponding to position 31 of any one of SEQ ID NOs: 1-15, 23-30, in various embodiments SEQ ID NO: 1 against lysine. In other preferred embodiments of the herein-described method, the mutations may comprise the substitution of the amino acid at the position corresponding to position 13 of any one of SEQ ID NOs: 1-15, 23-30, in various embodiments SEQ ID NO: 1 against aspartic acid, and the substitution of the amino acid at the position corresponding to position 31 of any one of SEQ ID NOs: 1-15, 23-30, in various embodiments SEQ ID NO: 1 against histidine. In other preferred embodiments of the herein-described method, the mutations may comprise the substitution of the amino acid at the position corresponding to position 13 of any one of SEQ ID NOs: 1-15, 23-30, in various embodiments SEQ ID NO: 1 against glutamic acid, and the substitution of the amino acid at the position corresponding to position 31 of any one of SEQ ID NOs: 1-15, 23-30, in various embodiments SEQ ID NO: 1 against arginine. In other preferred embodiments of the herein-described method, the mutations may comprise the substitution of the amino acid at the position corresponding to position 13 of any one of SEQ ID NOs: 1-15, 23-30, in various embodiments SEQ ID NO: 1 against glutamic acid, and the substitution of the amino acid at the position corresponding to position 31 of any one of SEQ ID NOs: 1-15, 23-30, in various embodiments SEQ ID NO: 1 against lysine. In other preferred embodiments of the herein-described method, the mutations may comprise the substitution of the amino acid at the position corresponding to position 13 of any one of SEQ ID NOs: 1-15, 23-30, in various embodiments SEQ ID NO: 1 against glutamic acid, and the substitution of the amino acid at the position corresponding to position 31 of any one of SEQ ID NOs: 1-15, 23-30, in various embodiments SEQ ID NO: 1 against histidine.

The herein-described method of reducing or attenuating the binding affinity of a polypeptide having a triple-helical structure for the Fc domain of immunoglobulin encompasses reducing or attenuating the binding affinity of a polypeptide having a triple-helical structure which are further characterized as having at least 70% sequence identity to the amino sequence of any one of SEQ ID NOs: 1-15, 23-30, in various embodiments SEQ ID NO: 1, as described elsewhere herein. This includes any variant non Fc binding polypeptides of SEQ ID NOs: 1-15, 23-30 disclosed herein, in particular those that are more specifically characterized with regard to the percent sequence identity to the amino sequence of any one of SEQ ID NOs: 1-15, 23-30, in various embodiments SEQ ID NO: 1. Accordingly, the present invention encompasses a method of reducing or attenuating the binding affinity of a polypeptide having a triple-helical structure for the Fc domain of immunoglobulin, the method comprising: selecting at positions 13 and 31 in the amino acid sequence of any one of SEQ ID NO: 1-15, 23-30, in various embodiments SEQ ID NO: 1; and b) mutating the at least two amino acid positions selected for mutation, wherein the mutating comprises the substitution of the amino acid at the position corresponding to position 13 of any one of SEQ ID NO: 1-15, 23-30, in various embodiments SEQ ID NO: 1 against an acidic amino acid selected from aspartic acid (D) and glutamic acid (E), and the substitution of the amino acid at the position corresponding to position 31 of any one of SEQ ID NO: 1-15, 23-30, in various embodiments SEQ ID NO: 1 against a basic amino acid selected from any one of arginine (R), lysine (K), and histidine (H).

In various embodiments, the polypeptide having a triple-helical structure generated, or prepared, or obtained, or obtainable by the method of reducing the binding affinity of a polypeptide having a triple-helical structure for the Fc domain of immunoglobulin disclosed herein has no detectable binding affinity for the Fc domain of immunoglobulin as determined by suitable methods such as Surface Plasmon Resonance.

Preferred embodiments include variant polypeptides of any of SEQ ID Nos: 1-15, 23-30, in various embodiments SEQ ID NO: 1. Some embodiments include a non-Fc binding polypeptide having a triple-helical structure and having at least 70% sequence identity to the amino sequence of any of SEQ ID Nos: 1-15, 23-30, in various embodiments SEQ ID NO: 1, wherein the polypeptide a) comprises an acidic amino acid residue, preferably an aspartic acid (D) residue, at the position corresponding to position 13 of any one of SEQ ID NOs: 1-15, 23-30, in various embodiments SEQ ID NO: 1; and b) comprises a basic amino acid residue, preferably an arginine (R) residue, at the position corresponding to position 31 of any one of SEQ ID NOs: 1-15, 23-30, in various embodiments SEQ ID NO: 1. Preferably, such polypeptide comprises at least any of 5, 6, 7, or 8 amino acid substitutions in helix 3, wherein helix 3 comprises amino acid residues corresponding to positions 40-56 of any one of SEQ ID NOs: 1-15, 23-30, in various embodiments SEQ ID NO: 1, preferably selected from positions corresponding to positions 42, 43, 44, 46, 47, 49, 50, 51, 53 and 54 of SEQ ID NO: 1. Further, such protein is comprising at least any of 6, 7 or 8 amino acid substitutions at positions comprising the amino acid residues of helix 1 and the first residue directly adjacent to helix 1, wherein helix 1 comprises amino acid residues corresponding to positions 7-19 of any one of SEQ ID NOs: 1-15, 23-30, in various embodiments SEQ ID NO: 1, preferably selected from positions corresponding to positions 7, 8, 10, 11, 14, 15, 18, and 20. In some embodiments, such protein is comprising at least 5, 6, 7, or 8 amino acid substitutions in helix 3, wherein helix 3 comprises amino acid residues corresponding to positions 40-56 of any one of SEQ ID NOs: 1-15, 23-30, in various embodiments SEQ ID NO: 1, preferably selected from positions corresponding to positions 42, 43, 44, 46, 47, 49, 50, 51, 53 and 54 of SEQ ID NO: 1, and at least any of 5, 6, 7 or 8 amino acid substitutions at positions comprising the amino acid residues of helix 2, wherein helix 2 comprises amino acid residues corresponding to positions 23-37 of any one of SEQ ID NOs: 1-15, 23-30, in various embodiments SEQ ID NO: 1, preferably selected from positions corresponding to positions 24, 25, 26, 27, 28, 29, 30, 32, 33, 35, 36, and 37.

Polynucleotides, vectors, host cells. One embodiment covers an isolated polynucleotide or nucleic acid molecule encoding a polypeptide as disclosed herein is provided. A further embodiment also encompasses polypeptides encoded by the polynucleotides as disclosed herein. Further provided is a vector, in particular an expression vector, comprising the isolated polynucleotide or nucleic acid molecule of the invention, as well as a host cell comprising the isolated polynucleotide or the expression vector. For example, one or more polynucleotides, which encode a polypeptide as disclosed herein may be expressed in a suitable host, and the protein so produced can be isolated. A vector means any molecule or entity (e.g., nucleic acid, plasmid, bacteriophage or virus) that can be used for transfer of protein-encoding information into a host cell. Suitable vectors that may be applied in the present invention are known in the art. Furthermore, an isolated cell comprising a polynucleotide or nucleic acid or a vector is provided. Suitable host cells include prokaryotes or eukaryotes, for example a host cell or a non-human host (cell) carrying a vector. A host cell is a cell that has been transformed, or is capable of being transformed, with a nucleic acid sequence and thereby expresses a gene of interest. Suitable bacterial expression host cells or systems are known in the art. Various mammalian or insect cell culture systems as known in the art can also be employed to express recombinant proteins.

Method of producing a protein of the invention. In a further embodiment, a method for the production of a non-Fc binding polypeptide as described is provided, the method comprising the step(s): (a) culturing a (suitable) host cell under conditions suitable for the expression of a non-Fc binding polypeptide so as to obtain said non-Fc binding polypeptide; and (b) optionally isolating said non-Fc binding polypeptide. Suitable conditions for culturing a prokaryotic or eukaryotic host are well known to a person skilled in the art.

A non-Fc binding polypeptide may be prepared by any conventional and well-known techniques such as plain organic synthetic strategies, solid phase-assisted synthesis techniques, or by commercially available automated synthesizers. They may also be prepared by conventional recombinant techniques, alone or in combination with conventional synthetic techniques.

In one embodiment, a method for the preparation of non-Fc binding is provided, as detailed herein, said method comprising the steps: (a) providing a nucleic acid molecule encoding a non-Fc binding polypeptide; (b) introducing said nucleic acid molecule into an expression vector; (c) introducing said expression vector into a host cell; (d) culturing the host cell in a culture medium; (e) subjecting the host cell to culturing conditions suitable for expression of the non-Fc binding polypeptide, thereby producing a non-Fc binding polypeptide; optionally (f) isolating the protein or polypeptide produced in step (e); and (g) optionally conjugating the protein or polypeptide to a solid matrix as described herein. In various embodiments of the present invention the production of the non-Fc binding polypeptide is performed by cell-free in vitro transcription and translation. The disclosure of the priority application EP 18 205 679.6 is incorporated herein by reference in its entirety, which means that the entire disclosure content of EP 18 205 679.6 is considered to form part of the disclosure content of the present application.

EXAMPLES

The following Examples are provided for further illustration of the invention. The invention, however, is not limited thereto, and the following Examples merely show the practicability of the invention on the basis of the above description. For a complete disclosure of the invention reference is made also to the literature cited in the application which is incorporated completely into the application by reference.

Example 1. Expression and Purification of Proteins

All constructs were expressed in *Escherichia coli* BL21 (DE3) using a low copy plasmid system under regulation of a T7 promoter. Proteins were produced cytoplasmatically in soluble form after induction by lactose included in the medium (autoinduction medium). BL21 (DE3) competent cells were transformed with the expression plasmid, spread onto selective agar plates (kanamycin) and incubated overnight at 37° C. Precultures were inoculated from single colony in 3 ml 2×YT medium supplemented with 50 μg/ml kanamycin and cultured for 6 hours at 37° C. at 200 rpm in a conventional orbital shaker in culture tubes. Main cultures were inoculated with 3 ml of precultures in 300 ml ZYM-5052 (0.5% glycerol, 0.2% lactose, 0.05% glucose, 0.5% yeast extract, 1.0% casamino acids, 25 mM $Na_2HPO_4$, 25 mM $KH_2PO_4$, 5 mM $Na_2SO_4$, 2 mM $MgSO_4$ and trace elements; see Studier 2005) that was supplemented with 50 μg/ml kanamycin in 1 L Erlenmeyer flasks. Cultures were transferred to an orbital shaker and incubated at 30° C. and 200 rpm. Recombinant protein expression was induced by metabolizing glucose and subsequently allowing lactose to enter the cells. Cells were grown overnight for approx. 17 hours to reach a final OD600 of about 2-4. Before the harvest, the OD600 was measured, samples adjusted to 0.6/OD600 were withdrawn, pelleted and frozen at −20° C. To collect biomass cells were centrifuged at 12000×g for 15 min at 22° C. Pellets were weighed (wet weight). Cells were stored at −20° C. before processing.

Proteins with affinity tag were purified by affinity chromatography and size exclusion. After affinity chromatography purification a size exclusion chromatography (SE HPLC or SEC) has been performed using an Akta system and a SUPERDEX™ 200 Hiload 16/600 column (GE Healthcare). The SEC column has a volume of 120 ml and was equilibrated with 2 CV. The samples were applied with a flow rate of 1 ml/min. Fraction collection starts as the signal intensity reaches 10 mAU. Following SOS-PAGE analysis positive fractions were pooled and their protein concentrations were measured. Further analysis included SOS-PAGE, SE-HPLC and RP-HPLC. Protein concentrations were determined by absorbance measurement at 280 nm using the molar absorbent coefficient. Reversed phase chromatography (RP-HPLC) has been performed using a Dionex HPLC system and a PLRP-S(5 μm, 300 A) column (Agilent).

Example 2. Analysis of Proteins by Surface Plasmon Resonance (SPR)

500-1500 RU $IgG_1$-Fc-domain (off-ligand) was immobilized on a CM-5 sensor chip (GE Healthcare); the chip was equilibrated with SPR running buffer. Surface-exposed carboxylic groups were activated by passing a mixture of EDC and NHS to yield reactive ester groups. Upon ligand binding, protein analyte was accumulated on the surface increasing the refractive index. This change in the refractive index was measured in real time and plotted as response or resonance units versus time. The analytes were applied to the chip in serial dilutions with a flow rate of 30 μl/min. The association was performed for 120 seconds and the dissociation for 360 seconds. After each run, the chip surface was regenerated with 30 μl regeneration buffer (10 mM HCL) and equilibrated with running buffer. Binding studies were carried out by the use of the BIAcore 3000 (GE Healthcare); data evaluation was operated via the BIAevaluation 3.0 software, provided by the manufacturer, by the use of the Langmuir 1:1 model (RI=0). Evaluated dissociation constants ($K_D$) were standardized against off-target and indicated. FIG. 1 shows binding affinity of the polypeptide of SEQ ID NO: 17 and the polypeptide of SEQ ID NO: 9 to IgG1-Fc. Shown is the change in refractive index measured in real time and plotted as response or resonance unit [RU] versus time [sec].

The binding affinity to the IgG-Fc domain was measured with reference to SEQ ID NO: 17 (see FIG. 1) or SEQ ID NO: 16 (see FIG. 2 and FIG. 3) or wild type Protein domains (see FIG. 3) or domain Z (see FIG. 3). After fitting the data with a 1:1 Langmuir model, a $K_D$ value of 3 nM was calculated for c27, and no $K_D$ value could be calculated for SEQ ID NO: 9 (see FIG. 1). For example, SEQ ID NO: 16 has a $K_D$=1.15 nM for IgG1 binding and Domain C (SEQ ID NO: 20) has a $K_D$=3.87 nM for IgG1 binding.

Example 3. Leaching Assay Using Fusion Proteins with Non-Fc Binding Protein of the Invention To determine low levels of leached Protein A derivative or Immunoglobulin binding protein in affinity chromatography is important for obtaining reliable results. Protein A ELISA Kits for the detection of native and recombinant Protein A (Repligen, Cat. No. 9000-1) were used for leaching assays according to manufacturers instructions. Fusion proteins tested: SEQ ID NO: 1 fused N-terminal to a protein BP1 or BP3 with binding affinities for a target, SEQ ID NO: 1 fused C-terminal to a protein BP1 or BP3 with binding affinities for a target, and SEQ ID NO: 1 fused N-terminal and C-terminal to a protein BP2 with binding affinities to a target. BP1, BP2, and BP3 are proteins of 58 amino acids with triple helix structure that have specific affinities to a target. For example, BP3 has 75.8% identity to SEQ ID NO: 1, and BP3 is a non-Fc-binding protein with modification in helix 2 and helix 3 compared to SEQ ID NO: 1. FIG. 4 shows the improved recovery of fusion proteins of SEQ ID NO: 1 with derivatives with specific target binding properties.

Example 4. Library Construction, Cloning of Libraries, Selection of Variants

Library Construction and Cloning of Libraries.

Scaffold SEQ ID NO: 1 (PAdelFc):

IAAKFDEAQSAADSEILHLPNLTEEQR-NAFRQSLSDDPSVSLEVLGEAQKLNDSQAPK (SEQ ID NO: 1)

Underlined are amino acid residues 7-19 (helix 1), amino acid residues 23-37 (helix 2), and amino acid residues 40-56 (helix 3).

Libraries comprising randomized amino acid positions were synthesized by triplet technology (ThermoFisher Scientific-GeneArt, Germany) or in house by randomized oligonucleotides generated by synthetic trinucleotide phosphoramidites (ELLA deisBiotech) to achieve a well-balanced amino acid distribution with simultaneously exclusion of cysteine and other amino acid residues at randomized positions. PAdelFc (SEQ ID NO: 1) was randomized in at least 5 amino acid positions in helix 3 and helix 2, or in helix 3 and helix 1. The following libraries were generated based on SEQ ID NO: 1:

- Library PA02 (SEQ ID NO: 31): randomized positions in helix 2 (25, 26, 28, 29, 30, 32, 33, 35, 36) and in helix 3 (42, 43, 44, 46, 47, 50, 54).
- Library PA12 (SEQ ID NO: 32): randomized positions in helix 2 (25, 29, 30, 32, 33, 36, 37) and in helix 3 (43, 46, 47, 50, 51).
- Library PA03 (SEQ ID NO: 33): randomized positions in helix 1 (7, 8, 10, 11, 14, 15, 30 18, 20) and in helix 3 (42, 43, 46, 47, 49, 50, 53, 54).
- Library PA13 (SEQ ID NO: 34): randomized positions in helix 1 (7, 8, 11, 14, 15, 18) and in helix 3 (42, 46, 49, 50, 53).

The corresponding cDNA library for PA02 and PA03 was provided by ThermoFisher Scientific as GeneArt Strings DNA Fragments. The coding region comprising helix one to three was amplified by PCR. Full length library molecules were generated by overlap extension PCR (oePCR), in which non-randomized regions were amplified using PAdelFc as template sequence.

Cloning of PA12, and PA13 was performed using randomized oligonucleotides (ELLA Biotech). The PAdelFc sequence served as template. Full length PA12 was generated by oePCR of one fragment comprising helix 1 and randomized helix 2 and another fragment comprising randomized helix 3. The coding region of PA13 was obtained in one PCR step using randomized oligonucleotides and PAdelFc sequence as template.

All generated library PCR products were ligated with a modified pCD87SA phagemid (herein referred to as pCD33-OmpA) using standard methods known to a skilled person. The pCD33-OmpA phagemid comprises an OmpA leader sequence and a direct fusion to CT-plll. Aliquots of the ligation mixture were used for electroporation of *E. coli* SS320 (Lucigen). Established recombinant genetic methods as known to somebody skilled in the art.

Primary selection by TAT Phage Display. The naïve library was enriched against the target using phage display as selection system. After transformation of competent bacterial SS320 cells (Lucigene) with phagemid pCD33-OmpA carrying the library, phage amplification and purification was carried out using standard methods known to a skilled person. For selection the target protein was immobilized as Fc-fusion of the target on DYNABEADS® Protein A or DYNABEADS® Protein G. The target concentration during phage incubation was lowered from 200 nM (first round) to 100 nM (second round) and 50 nM (third round). Target phage complexes were magnetically separated from supernatant and washed several times. Target bound phages were eluted by trypsin. To deplete the phage library of Fc-binding variants a preselection of phages with immobilized Fc-fragment of IgG1 (Athens Research & Technology) was performed prior to round two and three. To identify target specific phage pools, eluted and reamplified phages of each selection round were analysed by phage pool ELISA. Wells of a medium binding microtiter plate (Greiner Bio-One) were coated with target-Fc (2.5 μg/ml) and Fc-fragment of IgG1 (2.5 μg/ml), respectively. Bound phages were detected using α-M13 HRP-conjugated antibody (GE Healthcare).

Cloning of target binding phage pools into an expression vector. Selection pools showing specific binding to the target in phage pool ELISA were amplified by PCR according to methods known in the art, cut with appropriate restriction nucleases and ligated into a derivative of the expression vector pET-28a (Merck, Germany) comprising a Strep-Tag II (IBA GmbH).

Single colony hit analysis. After transformation of BL21 (DE3) cells (Merck, Germany) kanamycin-resistant single colonies were grown. Expression of the target-binding modified scaffold variants was achieved by cultivation in 384 well plates (Greiner Bio-One) using auto induction medium (Studier, 2005, Protein Expr. Purif. 41 (1): 207-234). Cells were harvested and subsequently lysed chemically or enzymatically by BugBuster reagent (Novagen) and mechanically by freeze/thaw cycles, respectively. After centrifugation the resulting supernatants were screened by ELISA with immobilized target on High Bind 384 ELISA microtiter plates (Greiner Bio-One). Detection of bound protein was achieved by STREP-TACTIN® HRP Conjugate (IBA GmbH) in combination with TMB-Plus Substrate (Biotrend, Germany). The reaction was stopped by addition of 0.2 M $H_2SO_4$ solution and measured in a plate reader at 450 nm versus 620 nm.

Maturation selection and analysis. For affinity maturation two rounds of panning were performed. Fc-fusion of target was employed at a concentration of 50 nM and 5 nM in round one and two, respectively. For both rounds a preselection with Fc-fragment of $IgG_1$ was performed. To analyse the matured and selected pools for specific target binding a phage pool ELISA was performed followed by cloning of positive pools into expression vector pET-28a and hit ELISA as described herein.

The invention claimed is:

1. A polypeptide having at least 90% identity to any one of SEQ ID NOs: 1-15 and 23-30, wherein the polypeptide comprises:

a) an acidic amino acid selected from aspartic acid (D) and glutamic acid (E) at the position corresponding to position 13 of SEQ ID NO: 1-15 and 23-30; and b) a basic amino acid selected from any one of arginine (R), lysine (K), and histidine (H) at the position corresponding to position 31 of SEQ ID NOs: 1-15 and 23-30, and further wherein the polypeptide has no detectable binding affinity for the Fc domain of immunoglobulin as determined by Surface Plasmon Resonance (SPR).

2. The polypeptide according to claim 1, wherein the polypeptide comprises:

a) an aspartic acid (D) at the position corresponding to position 13 of SEQ ID NOS: 1-15 and 23-30; and b) an arginine (R) at the position corresponding to position 31 of SEQ ID NOs: 1-15 and 23-30.

3. A fusion protein comprising the polypeptide according to claim 1.

4. A method for generating a polypeptide according to claim 1 with binding affinity for a target protein that is not an immunoglobulin, the method comprising:

a) providing one or more polypeptides according to claim 1;

b) contacting the one or more polypeptides of a) with a target protein;

c) identifying a complex comprising a polypeptide according to claim 1 bound to the target protein; and d) obtaining a polypeptide according to claim 1 that is capable of binding to the target protein.

5. A composition comprising the polypeptide according to claim 1.

6. A polynucleotide encoding the polypeptide according to claim 1.

7. The polypeptide according to claim 1, wherein relative to SEQ ID NO: 1, the polypeptide comprises one or more amino acid substitutions at amino acid positions selected from the group consisting of 1, 2, 4, 5, 7-9, 11, 13, 14, 25, 31, 35, 40, 42-44, 49, 53, and 58, and further where optionally the one or more amino acid substitutions are selected from the group consisting of asparagine (N) at amino acid 1;

aspartic acid (D) at amino acid 2; glutamine (Q) at amino acid 4, histidine (H) at amino acid 5, lysine (K) at amino acid 7, aspartic acid (D) or glutamic acid (E) at amino acid 8, alanine (A) at amino acid 9, serine(S) at amino acid 11, glutamic acid (E) at amino acid 13, tyrosine (Y) at amino acid 14, aspartic acid (D) at amino acid 25, lysine (K) or histidine (H) at amino acid 31, arginine (R) at amino acid 35, glutamine (Q) at amino acid 40, lysine (K) at amino acid 42, alanine (A) or serine(S) at amino acid 43, leucine (L) or isoleucine (I) at amino acid 44, alanine (A) at amino acid 46, lysine (K) at amino acid 49, glutamic acid (E) at amino acid 53, serine(S) and proline (P) at amino acid 58.

8. The polypeptide according to claim 1, wherein the polypeptide comprises the amino acid sequence of any one of SEQ ID NOs: 1-15 and 23-30.

* * * * *